United States Patent
Lalli

(10) Patent No.: US 12,410,076 B2
(45) Date of Patent: Sep. 9, 2025

(54) METHOD FOR ELECTROCOAGULATION USING PLASMA DISCHARGE

(71) Applicant: Jason D Lalli, Washington, PA (US)

(72) Inventor: Jason D Lalli, Washington, PA (US)

(*) Notice: Subject to any disclaimer, the term of this patent is extended or adjusted under 35 U.S.C. 154(b) by 1033 days.

(21) Appl. No.: 17/194,955

(22) Filed: Mar. 8, 2021

(65) Prior Publication Data
US 2021/0214245 A1 Jul. 15, 2021

Related U.S. Application Data

(62) Division of application No. 15/274,860, filed on Sep. 23, 2016, now Pat. No. 10,941,058.

(51) Int. Cl.
C02F 1/463 (2023.01)
C02F 1/46 (2023.01)
C02F 1/461 (2023.01)

(52) U.S. Cl.
CPC ............ C02F 1/463 (2013.01); C02F 1/4608 (2013.01); C02F 1/46109 (2013.01);
(Continued)

(58) Field of Classification Search
CPC .... C02F 1/463; C02F 1/4608; C02F 1/46109; C02F 2001/46152; C02F 2201/4611; C02F 2201/46135; C02F 2201/4614; C02F 2201/46145; C02F 2201/4615; C02F 2201/4616; C02F 2201/46175; C02F 2201/4618; C02F 2301/046; C02F 1/4672; C02F 1/24; C02F 1/46114; C02F 1/72; C02F 2103/22; C02F 1/722; C02F 2301/066; C02F 1/766; C02F 2201/4612;
(Continued)

(56) References Cited

U.S. PATENT DOCUMENTS

| 2,964,679 A | 12/1960 | Schneider et al. |
| 3,390,836 A | 7/1968 | Monot et al. |

(Continued)

FOREIGN PATENT DOCUMENTS

| WO | 2005001164 A1 | 1/2005 |
| WO | WO-2013030591 A1 * | 3/2013 ............ C02F 1/463 |

OTHER PUBLICATIONS

Kim et al, "Self-Cleaning Filtration with Spark Discharge in Produced Water," International Journal of Heat and Mass Transfer, 88 (2015), 527-537 (Year: 2015).*

(Continued)

*Primary Examiner* — Xiuyu Tai
(74) *Attorney, Agent, or Firm* — Metz Lewis Brodman Must O'Keefe

(57) ABSTRACT

Methods for clarifying wastewater using electrocoagulation with plasma discharge is provided. The methods include contacting fluid within a reactor with at least one plasma producing electrode; applying electrical energy to the plasma producing electrode sufficient to generate plasma discharge in the fluid; generating plasma discharge in the fluid simultaneously with electrocoagulation of the fluid by electrochemically reacting the plasma producing electrode with the fluid; and initiating flocculent formation in the fluid from at least one of the plasma discharge and electrocoagulation in the fluid. The Invention is also directed to clarified fluid produced by such methods.

17 Claims, 12 Drawing Sheets

(52) U.S. Cl.
CPC ............... *C02F 2001/46152* (2013.01); *C02F 2201/4611* (2013.01); *C02F 2201/46135* (2013.01); *C02F 2201/4614* (2013.01); *C02F 2201/46145* (2013.01); *C02F 2201/4615* (2013.01); *C02F 2201/4616* (2013.01); *C02F 2201/46175* (2013.01); *C02F 2201/4618* (2013.01); *C02F 2301/046* (2013.01)

(58) Field of Classification Search
CPC .............. C02F 2201/4619; C02F 1/008; C02F 2209/05; C02F 1/78; C02F 2201/003; C02F 2201/4617; C02F 1/46; C02F 2201/4613; C02F 2301/024; C02F 2001/46123; C02F 2209/005; C02F 1/76; C02F 1/52; H05H 1/24; H05H 1/2406
See application file for complete search history.

(56) References Cited

U.S. PATENT DOCUMENTS

| | | | |
|---|---|---|---|
| 3,766,430 A | 10/1973 | Schlegel | |
| 3,835,288 A | 9/1974 | Henderson | |
| 4,329,211 A | 5/1982 | Plantes | |
| 4,988,917 A | 1/1991 | Cox | |
| 5,685,994 A | 11/1997 | Johnson | |
| 6,077,416 A | 6/2000 | Khalemsky et al. | |
| 6,099,703 A | 8/2000 | Syversen | |
| 6,294,061 B1 | 9/2001 | Morkovsky | |
| 6,358,398 B1* | 3/2002 | Halldorson | C02F 1/4672 205/756 |
| 6,582,592 B2 | 6/2003 | Arnaud | |
| 6,613,217 B1 | 9/2003 | Gilmore | |
| 6,689,271 B2 | 2/2004 | Morkovsky | |
| 6,719,894 B2 | 4/2004 | Gavrel | |
| 6,746,593 B2 | 6/2004 | Herbst | |
| 6,887,368 B2 | 5/2005 | Khalemsky et al. | |
| 7,067,204 B2 | 6/2006 | Nomura et al. | |
| 7,258,800 B1 | 8/2007 | Herbst | |
| 7,682,492 B2 | 3/2010 | Bradley | |
| 7,914,662 B2 | 3/2011 | Robinson | |
| 7,989,673 B2 | 8/2011 | Paskalov et al. | |
| 8,212,484 B2 | 7/2012 | Zolezzi-Garreton et al. | |
| 8,347,960 B2 | 1/2013 | Mothersbaugh | |
| 8,398,829 B1 | 3/2013 | Tarbet | |
| 8,435,391 B2 | 5/2013 | Wiemers | |
| 8,486,253 B2 | 7/2013 | Tarbet | |
| 8,926,914 B2 | 1/2015 | Seok et al. | |
| 8,999,173 B2 | 4/2015 | Schwartzel et al. | |
| 9,028,689 B1 | 5/2015 | Fraim et al. | |
| 9,409,800 B2 | 8/2016 | Fraim et al. | |
| 2001/0004063 A1 | 6/2001 | Oh | |
| 2006/0096853 A1* | 5/2006 | King | C02F 1/463 204/230.2 |
| 2010/0116686 A1 | 5/2010 | Wiemers et al. | |
| 2011/0129671 A1 | 6/2011 | Edgington | |
| 2011/0180422 A1 | 7/2011 | Mothersbaugh et al. | |
| 2012/0255872 A1 | 10/2012 | Smith et al. | |
| 2014/0151938 A1* | 6/2014 | Hsieh | C02F 1/4608 264/483 |
| 2014/0276717 A1 | 9/2014 | Wan et al. | |
| 2014/0326681 A1 | 11/2014 | Denvir et al. | |
| 2015/0137677 A1 | 5/2015 | Sohn | |
| 2015/0246830 A1* | 9/2015 | Lalli | C02F 1/463 204/242 |

OTHER PUBLICATIONS

B.R. Locke, et al., Electrohydraulic Discharge and Nonthermal Plasma for Water Treatment, Ind. Eng. Chem. Res. 2006, 882-905, 45, American Chemical Society, Washington, DC, US.

"Self-Cleaning Filtration with Spark Discharge in Produced Water" (Kim et al.); International Journal of Heat and Mass Transfer, vol. 88 (2015), p. 527-537.

International Searching Authority; International Search Report and Written Opinion of the International Searching Authority; International Application No. PCT/US17/52859; Patent Cooperation Treaty; pp. 1-13; publisher United States International Searching Authority; Published Alexandria, Virginia, US; copyright and mailing date Dec. 5, 2017; copy enclosed (13 pages).

* cited by examiner

METHOD FOR ELECTROCOAGULATION USING PLASMA DISCHARGE

CROSS-REFERENCE TO RELATED APPLICATIONS

The present application is a divisional of co-pending U.S. patent application Ser. No. 15/274,860, filed on Sep. 23, 2016, the contents of which are incorporated by reference herein in its entirety.

FIELD OF THE INVENTION

This invention relates to devices, systems and methods of using plasma discharge to augment electrocoagulation for water and wastewater treatment, purification, clarification, and decontamination.

BACKGROUND

Wastewater is a common byproduct of many industrial processes, including manufacturing, oil and gas production, power generation, agriculture and farming, and is also a concern in municipal applications such as sewage treatment, drinking water production, and water reuse. Many of these fluids typically contain contaminants such as metals, minerals, organic and inorganic compounds, may include emulsions of oils or immiscible compounds, and may also include bacteria and other microorganisms. Purification and decontamination of this wastewater permits reuse of the water in further industrial applications, or depending on the levels of purity obtainable, safe release into the environment or even back into municipal circulation for use.

While existing water treatment technologies can remove many of the contaminants and solids from wastewater, certain contaminants like heavy metals, petroleum-based compounds and hydrocarbons, refractory organics, and emulsified oils are difficult to remediate. Advanced treatment technologies are available, but these tend have high capital and operational expenses associated with them.

Electrocoagulation is a technique that has been developed to separate these hard to remove contaminants from wastewater. It is characterized by passing an electric current between electrically conductive electrodes (such as iron, aluminum or titanium) submerged within the fluid to be treated, where one electrode acts as an anode and the other as a cathode. The careful application of electrical stimulus causes ions to be released or donated from the electrodes in a controlled fashion, which then interact or react with the contaminants in the fluid. As a result of these electrochemical reactions, the contaminating compounds and metals in the fluid begin to coagulate together and settle out of solution. This coagulated matter is often called flocculent or "floc." The charged state of the fluid further induces a separation between the fluid and the contaminant(s) within the fluid. When the floc reaches a critical mass, it becomes heavier than water and sediments to the bottom of the fluid. As more floc forms and settles, the turbid wastewater becomes increasingly clarified and clearer. The floc may be removed by in a traditional clarification step or by other appropriate methods. Further processing may be utilized to capture additional contaminants.

Electrical energy in the form of direct current (DC) or alternating current (AC) can be employed in electrocoagulation, and may be single phase or multiple phase, such as three-phase AC. Application of energy in terms of amperage, voltage, and power are kept within parameters to maintain the controlled donation of ions from the electrode material. Maximizing electrode surface area exposed to the fluid is therefore also important to the electrocoagulation process to provide sufficient ions for reacting with the wastewater to induce coagulation. However, this process consumes the electrodes over time, and therefore the amount of energy supplied to the system is carefully controlled to avoid rapid burn-out of the electrodes. Indeed, overcharging of an electrocoagulation system can lead to electrical shorting of the system, which is considered dangerous and is generally avoided.

Plasma generation is well-known and demonstrated in the context of gases, such as the creation of electric sparks, Jacob's ladders, and neon lights. Generating plasma within a liquid, sometimes called electrohydraulic plasma discharge, is also already known and has been studied since at least 2006. It is used in underwater welding machines to create plasma arcs for welding. Electrohydraulic plasma generation involves subjecting the liquid to a very strong electric or electromagnetic field through electrodes submerged within the liquid.

There are different types of plasma discharge. For example, corona discharges occur around electrodes that are electrified with high voltage, where the energy is enough to form a conductive region, visible as a glow of light around the electrode. With higher voltages, plasma arcs occur where the electrical discharge forms a channel between the electrode and a point. Arcs are seen as bright beams connecting two points. When discharged in liquid, plasma arcs also produce strong shock waves, cavitation, ionization of gases trapped within bubbles and microbubbles, as well as strong UV emission, and the creation of free radicals and reactive species. Electrohydraulic plasma discharge has been used for water treatment, for its ability to efficiently destroy microorganisms, doing damage at the cellular level such as disrupting their cell walls and damaging the DNA with the UV light and reactive species produced. However, these are highly electrified, unstable conditions that are difficult to control.

SUMMARY

An apparatus and system is disclosed that creates plasma discharge for the augmentation of electrocoagulation of wastewater. The plasma discharge occurs in the same reactor, within the same fluid, and at the same time as electrocoagulation, and shall be referred to as plasma electrocoagulation ("PEC") herein. The apparatus and system provide markedly more efficient electrocoagulation than previously known as a result of the high energy of the plasma discharge delivering not only the standard reduction surface charges of contaminants in solution to allow van der Waals forces to attract them together to form a flocculant, but also to cause the generation of complex covalent and ionic bonding among the contaminants and also between the contaminants and the electrically active electrode metal donated into the fluid. Effectively, the plasma causes the metal ions released from the electrodes during electrocoagulation to have a higher, more energized state that is more reactive with the wastewater contaminants. Additionally, the amount of metal ions needed to perform the same level of purification is less with the PEC described herein than with standard electrocoagulation processes. Accordingly, less electrode mass is consumed in plasma electrocoagulation than in standard electrocoagulation systems providing comparable levels of purification, which has been confirmed by weight measurements of the electrodes before and after treatment. In other words, the present plasma electrocoagulation apparatus and system can provide orders of magnitude more work than a comparably sized standard electrocoagulation system. For example, 6.5 mm diameter cylindrical rod shaped electrodes can do the same amount of work in the present PEC apparatus as ten square feet of electrode plates in a standard electrocoagulation system. This effect is seen regardless of whether plasma discharge occurs as a corona glow or point-to-point arcing, though operational advantages exist for both. Therefore, the plasma electrocoagulation apparatus and systems described herein allow for smaller reactors, less retention or reaction time, and a markedly more efficient electrocoagulation process overall.

The PEC apparatus includes a reactor having a plurality of plasma producing electrodes submerged in fluid, such as wastewater, during treatment. High amounts of energy are supplied to the electrodes from a power supply located exterior to the reactor. Upon electrical stimulation, plasma discharge is generated by the electrodes, such as at the distal tips of the electrodes disposed within the fluid inside the reactor, and ions are donated from the electrodes into the fluid for electrochemical reaction with the fluid and electrocoagulation. In a preferred embodiment, three-phase AC power is supplied to electrodes, where each different electrode receives a different phase of AC power. The reactor further includes an influx port for the introduction of influent, or contaminated fluid/wastewater to be treated, into the reactor, and an efflux port for removing effluent, or treated fluid/wastewater, from the reactor. A housing may also be provided so the reactor can be attached to a skid or other support structure for physical stability and to permit movement of the reactor, such as to particular sites of use.

In at least one embodiment, the electrodes may be coated or surrounded by an insulating material, so as to expose only a portion of the electrode. Only the exposed portion of the electrode will donate ions to the wastewater upon the application of energy for electrocoagulation. The insulating material also burns at a uniform rate upon contact with the plasma discharge, and peels away from the electrode as it burns, revealing additional electrode surface. In this manner, the insulating material may control the rate of reaction for the plasma electrocoagulation process.

A system for treating fluid, such as wastewater, is also disclosed which includes the above-described reactor in electrical communication with a power supply capable of generating and transmitting high energy power, current and/or voltage to the electrodes. Multiple reactors may be included in the system, each having a plurality of plasma generating electrodes and receiving fluid for treatment. A recirculation loop may be provided to permit multiple passes of the fluid/wastewater through the reactor for multiple rounds of treatment. Pumps move the fluid/wastewater into and out of the reactor and through the recirculation loop, and may work in coordination with flow control valves and sensors, such as temperature sensors. The contaminated wastewater may be fed directly from its generation source to the reactor, or the system may optionally include a holding tank to collect the contaminated wastewater prior to treatment. After treatment, the treated fluid may be pumped into a reaction tank to allow clarification and sedimentation to occur, directly into secondary or tertiary treatment tanks such as may be part of a larger water treatment system, or directly into a filter. A control module may monitor the system overall from information provided by the sensors, and provide operation instruction and direction to the power source, pumps and valves.

A method for treating fluid is also disclosed including providing plasma producing electrodes in contact with fluid, such as contaminated wastewater, and applying electrical energy to the electrodes sufficient to generate plasma discharge in the fluid, and generating plasma discharge within the contaminated fluid simultaneously with electrocoagulation in the fluid. The plasma generated may be corona discharge or plasma arcing between electrodes. The method may also include applying a constant level of power to the electrodes and varying at least one of the voltage and current according to the ionic character of the contaminated fluid during treatment. In other embodiments, the method includes applying a constant level of voltage to the electrodes and varying at least one of the power and current during treatment. In still other embodiments, the method includes applying a constant level of current and varying at least one of the voltage and power during treatment. Further, the method may include varying the retention time of the wastewater in the reactor, which may be achieved by varying the flow rate of influent, varying the flow rate in the recirculation loop, or both. The method may also include automating the adjusting of power, voltage and current supplied to the electrodes, and/or automating the varying the flow rates of influent and recirculation loop.

The plasma electrocoagulation apparatus, system and method, together with their particular features and advantages, will become more apparent from the following detailed description and with reference to the appended drawings.

DETAILED DESCRIPTION

As shown in the accompanying drawings, the present invention is directed to an apparatus, system, method, and product produced by the method of electrocoagulation using plasma discharge. By using high voltages for the creation and utilization of plasma in the performance of electrocoagulation, a much more efficient method of purifying, clarifying, and decontaminating fluid/wastewater is provided than previously seen in the field of electrocoagulation. As used herein, the terms "contaminated wastewater" and "influent" shall be used interchangeably, and shall refer to wastewater of all types, including wastewater that results from industrial processes, manufacturing processes, oil and gas production, medical procedures, municipal or sewage water, or other impure liquid that may contain suspended solids, oils, emulsions, organics, refractory organics, inorganics, minerals, heavy metals, and microorganisms that is in need of purification and/or decontamination. "Treated wastewater" or "effluent" shall be used interchangeably with each other, and shall refer to wastewater of any category identified above which has undergone the plasma electrocoagulation ("PEC") treatment described herein. The terms "fluid" and "wastewater" may be used interchangeably, although it should be understood that "fluid" may be any liquid not limited to wastewater.

Figure 1:
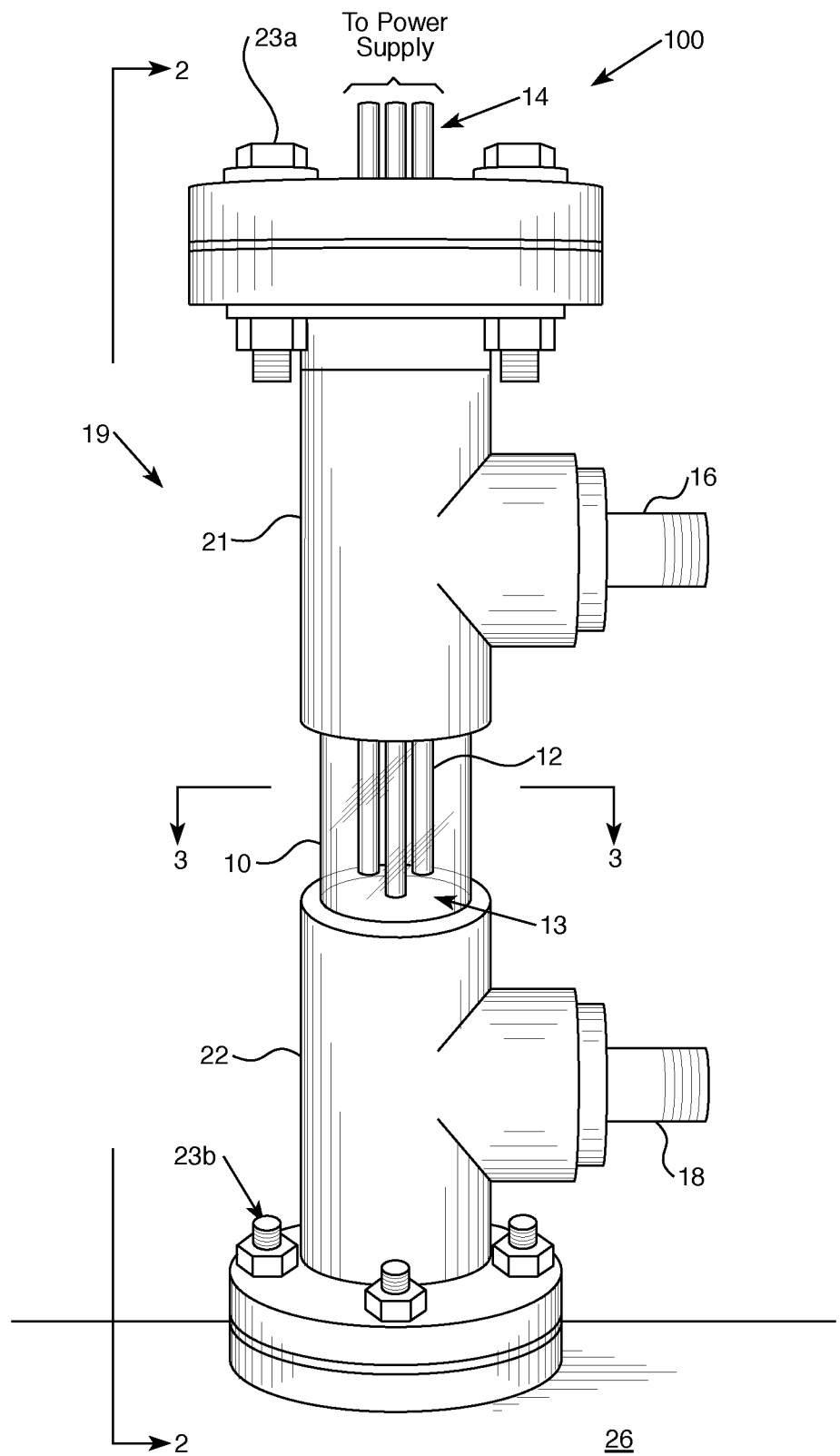
FIG. 1 is a front perspective view of one embodiment of an apparatus of the present invention utilizing three straight cylindrical electrodes.

Referring to FIG. 1, a PEC apparatus 100 is provided that is used for the treatment of fluid, such as wastewater, with plasma electrocoagulation. The apparatus 100 includes a reactor 10 in which the plasma electrocoagulation process occurs. The reactor 10 has a hollow interior space 11 of a sufficient size to hold a volume of wastewater during the plasma electrocoagulation treatment. The reactor 10 further includes a core 20 comprised of a plurality of plasma producing electrodes 12 extending through at least a portion of the interior space 11 of the reactor 10, such as extending into the interior space 11. In at least one embodiment, the electrodes 12 are suspended in the interior space 11 of the reactor 10 such that terminal ends of the electrodes do not contact any surface of the reactor 10 or apparatus 100. The reactor 10 may be made of any material suitable for electrocoagulation, such as plastic, fiberglass, Plexiglas®, or other material that is not electrically conductive.

The apparatus 100 may include at least one, but preferably a plurality of plasma producing electrodes 12 that are electrically conductive. The electrodes 12 may be made of any suitable electrically conductive material, including but not limited to iron, aluminum, palladium, and titanium. Each of the electrodes 12 has a first end 13 extending into the interior space 11 of the reactor 10 and which is submerged in the wastewater during the plasma electrocoagulation treatment, described in greater detail below. Opposite of the first end 13 is the second end 14 of each electrode 12. The second ends 14 of the electrodes 12 receive the electricity for electrocoagulation, such as from a power source or power supply. The second ends 14 may therefore extend to the exterior of the reactor 10, and are in electrical communication with a power source that provides the electricity to the apparatus 100. For instance, the second ends 14 may be connected to leads (not shown) or other structure for supplying an electrical connection between the electrodes 12 and the power source. Power may be supplied in AC or DC current, and may be single phase or multiphase, such as three-phase. Further, in some embodiments, DC power is applied to the system with one electrode 12 functioning as a cathode and the other as an anode, AC power is applied to one electrode with the other electrode 12 acting as a neutral or ground. In other embodiments, three or more phases of alternating current is applied to the electrodes 12 such that each electrode 12 receives electrical current in an alternating fashion as associated with each phase of the supplied power.

The electrodes 12 may be of any shape, size, configuration and arrangement as permits the generation and discharge of plasma at the electrocoagulation electrodes. However, it is thought that focusing the energy in the electrodes to a point or points along the electrode 12 creates a higher energetic state at the localized point(s), which is sufficient to generate plasma discharge. As noted previously, the plasma discharge may be corona discharge, also known as plasma glow, or plasma arcing between the electrode tips.

Therefore, in at least one embodiment the electrodes 12 may have an elongate cylindrical shape as shown in FIGS. 1-7. In such embodiments, the terminal ends 13 of the electrodes 12 which are in contact with, or at least partially submerged in, the fluid are the points at which plasma generation and discharge occurs. Further, in some embodiments, as in FIGS. 1, 2, 6 and 7, the electrodes 12 may be straight cylinders or rods which are positioned parallel to each other. In other embodiments, as in FIG. 5, the electrodes 112 may be parallel along at least a portion of their length, and may curve or angle at or near the terminal first ends 113 to so the tips of the electrodes 112 are directed toward each other. This arrangement further focuses the energy for plasma generation. In still other embodiments (not shown), the electrodes 12 may be plates or may have a non-uniform or irregular shape, and plasma discharge may occur at any point(s) along the surface of the electrode 12. These points may be discrete point(s) along the electrode 12, or continuous areas of the electrode 12 surface.

Figure 3:
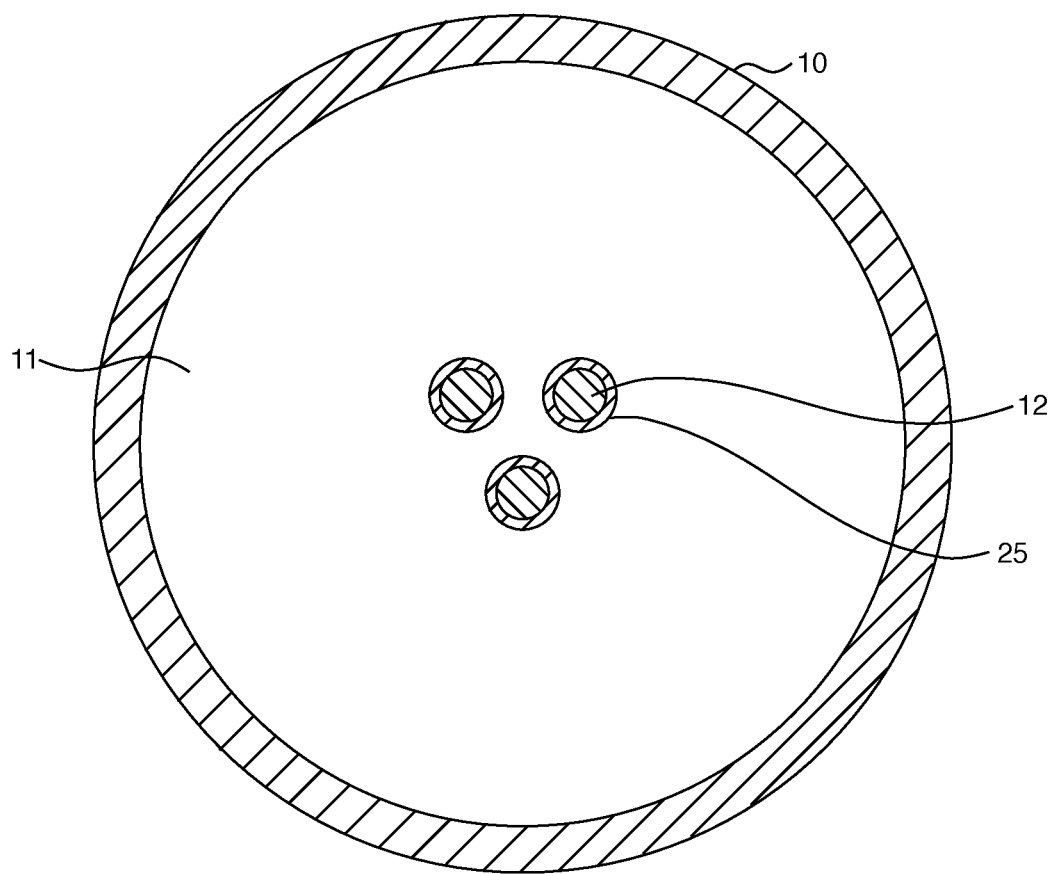
FIG. 3 is a cross-sectional view of the reaction chamber of FIG. 1.

Parallel arrangement of the electrodes 12, 112 within a core 20 is preferable, both for electrical conductivity and space-saving concerns. Some embodiments, however, contemplate non-parallel, irregular, skewed or divergent arrangements of electrodes. Further, any number of electrodes 12 may be provided within a core 20. In some preferred embodiments, such as when three-phase AC power is used for providing electrical stimulation, electrodes 12 are provided in multiples of 3 so that each phase can be received by one or more electrodes 12. For example, as shown in FIG. 3, three electrodes 12 make up the core 20, where each of the electrodes 12 receives a different phase of AC current. In other embodiments, as in FIGS. 4A and 4B, multiple electrodes 12 make up the core 20. Any number of electrodes 12 is contemplated, and may preferably be in multiples of 3 for the delivery of 3-phase power, such as 3, 6, 9, 27, and 30 electrodes, although any number of electrodes 12 may be included in the core 20 depending on the size of the reactor 10 and the type of power or energy provided.

Figure 4A:
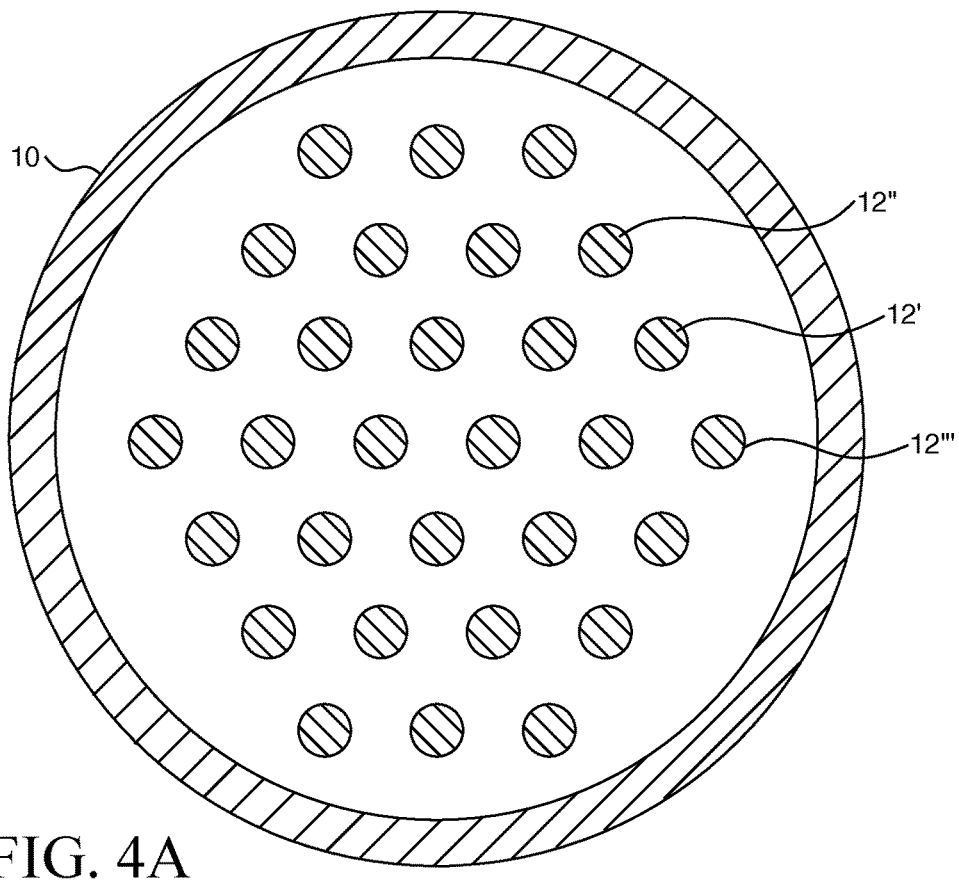
FIG. 4A is a cross-sectional view of a reaction chamber of another embodiment of the apparatus.
Figure 4B:
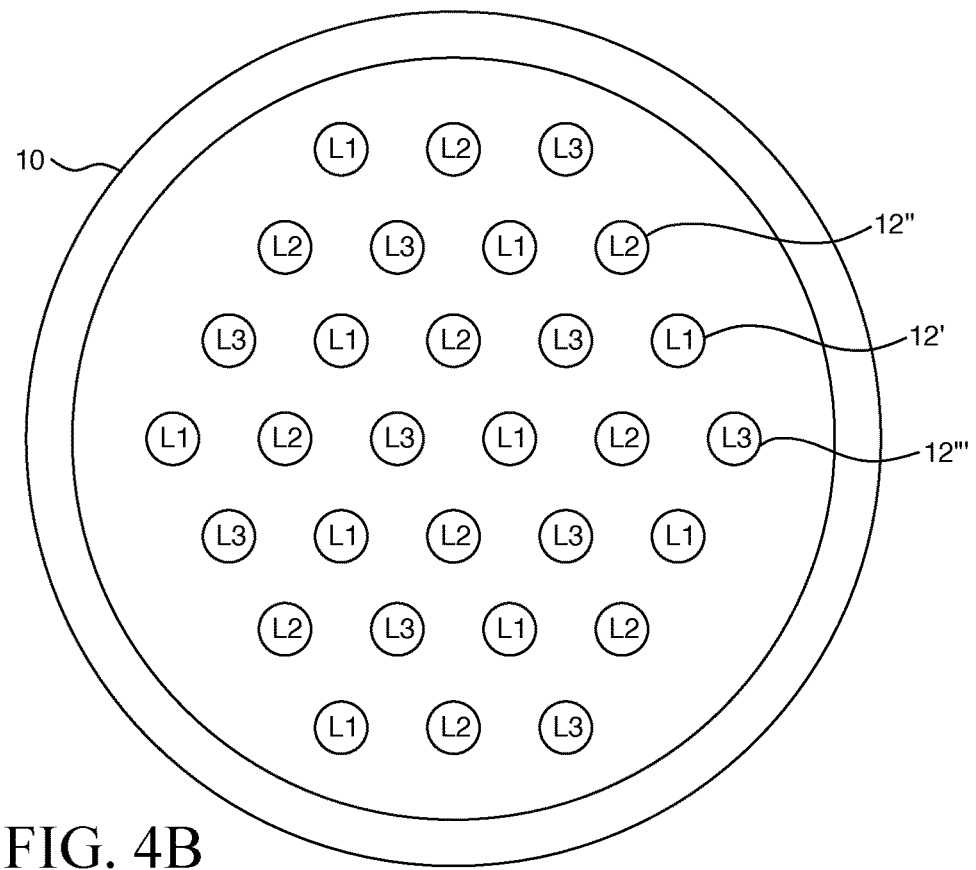
FIG. 4B is a schematic diagram of the electrodes from the reaction chamber of FIG. 4A showing the electric phase distribution.
Figure 5:
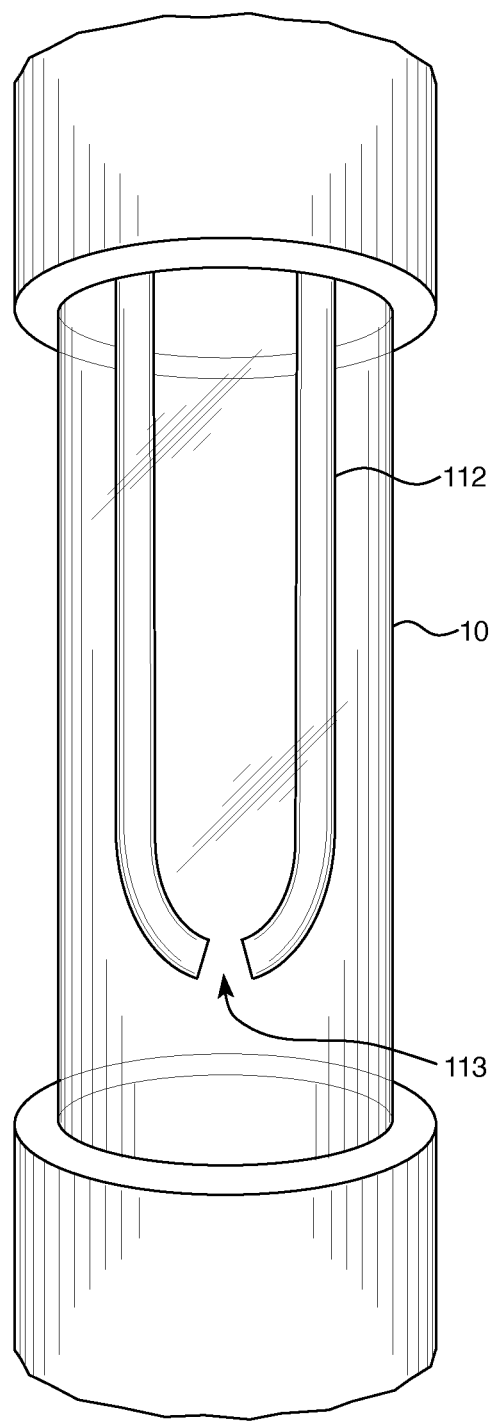
FIG. 5 is a front perspective view of another embodiment of the apparatus utilizing curved cylindrical electrodes.

In embodiments involving multiple electrodes, as in three-phase AC having more than three electrodes 12, each of the electrodes 12 receiving the same phase of power may be electrically connected in parallel with each other. For example, as depicted in FIG. 4B, the electrodes 12' receiving the first phase (L1) of AC power are electrically connected in parallel, and thus receive power simultaneously. Electrodes 12" receiving the second phase (L2) of AC power are similarly electrically connected in parallel to each other and receive power simultaneously with each other and after the first phase electrodes 12' receive power. Electrodes 12''' receiving the third phase (L3) of AC power are electrically connected to each other and receive the third phase of AC power simultaneously and after the second phase electrodes 12" receive power. As the AC power cycles back to the first phase, the corresponding electrodes 12' receive power and the cycle repeats.

The electrodes 12', 12" and 12''' may be arranged so that each electrode receiving a particular phase of power is adjacent to and/or at least partially surrounded by electrodes receiving the other phases of power. For example, as in FIG. 4B, each electrode 12' receiving the first phase (L1) of power is adjacent and in proximity to at least one electrode 12" receiving the second phase (L2) power and at least one electrode 12''' receiving the third phase (L3) power. The electrodes 12' at the edges of the core 20 may only be partially surrounded, and may only have one electrode 12", 12''' receiving another phase of power adjacent or nearby. The electrodes 12' near the interior of the core 20 may have two, or three, or more electrodes 12", 12''' receiving each of the other phases of power surrounding and in proximity thereto. Regardless of the arrangement, no electrode 12' is adjacent to another electrode 12' receiving the same phase of power. This applies equally to the electrodes 12" receiving second phase power (L2) and electrodes 12''' receiving third phase power (L3). This arrangement allows plasma generation to occur consistently throughout the core 20. In other embodiments, the electrodes 12', 12" and 12''' may be electrically connected in series with each other, or different groupings or sets of electrodes 12', 12" and 12''' may be electrically connected in series, so that plasma discharge occurs in discrete portions of the core 20 at a time.

Adjacent electrodes 12 are spaced apart from each other a sufficient distance to be electrically separate from one another, and yet close enough to facilitate the formation and discharge of plasma between them. The precise spacing between electrodes 12 depends on a number of factors, including but not limited to the size, shape, diameter, and arrangement of the electrodes. For example, in at least one embodiment the electrodes 12 are spaced from 1 cm to 3 cm apart, although spacing of less than 1 cm and greater than 3 cm are possible and also contemplated herein. However, if the electrodes 12 are too close together, the plasma discharge may fuse the electrode ends 13 together. If the electrodes 12 are too far apart, the plasma discharge between electrodes 12 creates a highly energetic state that becomes more difficult to control as space between the electrodes 12 increases. Therefore, spacing between electrodes 12 should balance these factors. In a preferred embodiment, the electrodes 12 are spaced 2 cm apart.

The diameter of the electrodes 12 will impact how closely the electrodes 12 may be spaced from one another. The smaller the diameter, the closer the spacing is possible between electrodes 12. For example, the diameter of the electrodes 12 may be in the range of 1 mm to 35 cm depending on the size of the reactor 10, the power available, the desired spacing, and even the particular application of fluid treatment. In at least one embodiment, the electrodes 12 may be between 3 mm and 30 mm in diameter. In a preferred embodiment, the electrodes 12 may be between 6 mm and 15 mm in diameter. In some preferred embodiments, the electrodes 12 may have a 6.4 mm, 12.7 mm or 25.4 mm diameter, and may be spaced from 1 cm to 3 cm apart. In a most preferred embodiment, the electrodes 12 have a 6.4 mm diameter and are spaced 2 cm apart. The electrodes 12 comprising the core 20 may all have the same diameter, or may have different diameters. However, as the diameter of the electrode 12 increases, so does the amount of voltage and power needed to generate plasma. Therefore, in a preferred embodiment, the electrodes 12 comprising the core 20 are all of a uniform diameter.

As indicated in FIG. 1, the electrodes 12 may be connected at their second ends 14 to a power source that supplies electrical current, voltage, and/or power to the electrodes for plasma generation and electrocoagulation. The power source is preferably external to the reactor 10, and connects to the second ends 14 of electrodes 12 by leads, clamps or other electrically conductive communication. The electrical energy provided by the power supply can be described by the following equation:

$$VA = V \times I$$

where VA is power, measured in Volt-Amperes (VA); V is voltage, measured in volts (v); and I is current, measured in amperes (amps). Accordingly, the electrical energy provided to the core 20 may be described in terms of power, voltage, or current depending on which aspect is targeted, although they are all mathematically related.

For instance, in some embodiments, power may be applied in the range of 150 VA to 10 kVA, such as when the reactor includes three electrodes 12 and 5-7 volts are used. Other ranges of power may be supplied to the electrodes 12, and the power supplied to a reactor 10 may vary by as much as a factor of 60 depending at least on the level and character of contamination of the wastewater being treated and the diameter, spacing, arrangement and number of electrodes 12 in the core 20. For example, as the diameter of electrodes 12 increases, the power supplied also increases. Therefore, in other embodiments, power may be applied in the range of 1.5 kVA to 1 MVA, such as when thirty (30) electrodes 12 are included in the reactor. However, the more electrodes 12 are present in the core 20, the less the power may need to be increased since each electrode will receive the power provided. These are just a few illustrative examples, and are not intended to be limiting.

In other embodiments, energy is supplied to the electrodes 12 in the range 5 to 100 amps of current. The optimal current level varies depending on the number and spacing of electrodes 12 within the core. For example, with three electrodes 12, the amps may be in the range of 7-9 amps applied or as may be measured at the core 20. In other embodiments, such as with 9 electrodes, the amps may be in the range of 21-27 amps. In still other embodiments, 30 electrodes are included in the core, and the amps are in the range of 70-90 amps. Accordingly, as the number of electrodes 12 in the core 20 increases, the amps also increase.

Figure 2:
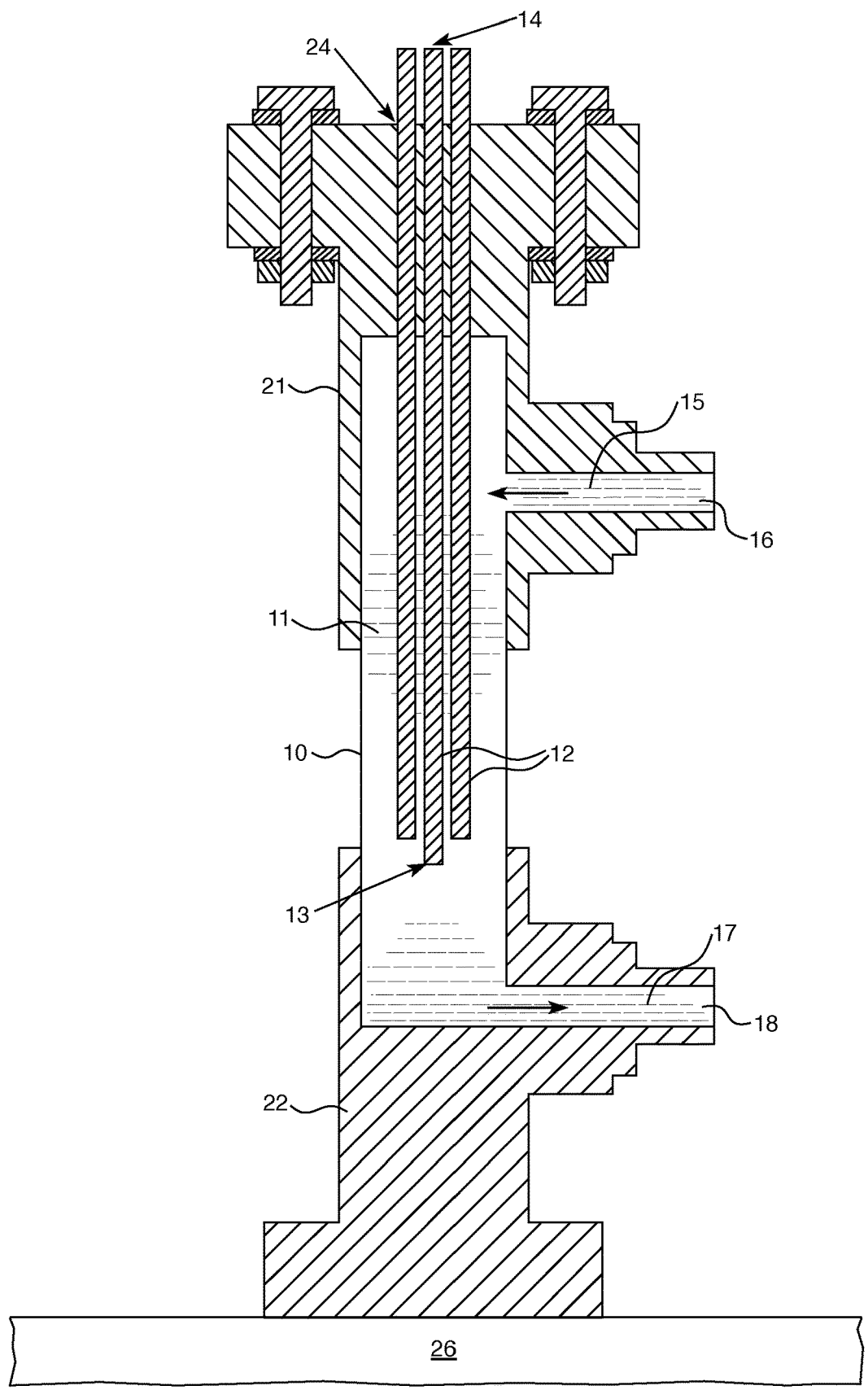
FIG. 2 is a cross-section of the apparatus of FIG. 1.

The spacing of the electrodes 12 also impacts the preferred amps used. For instance, in arrangements where the electrodes 12 are arranged to form an equilateral triangle between them, such as shown in FIGS. 1-3, the spacing between the electrodes 12 may be between 1 and 3 cm. The amps increase or decrease with the spacing of the electrodes. For example, when the electrodes 12 are spaced 2 cm from each other, the current may be in the range of 7-10 amps, and preferably 7 amps. In embodiments where the spacing between electrodes 12 is 1.25 cm, the preferred current is 6 amps or less. In embodiments where the spacing between electrodes 12 is 3 cm, the preferred current is 10 amps or more. These examples provide optimal power consumption, but are non-limiting and higher or lower amps may be used.

In other embodiments, such as when three-phase AC energy is supplied to three electrodes 12, the voltage is in the range of 10 to 800 volts. The voltage may vary depending on the conductivity of the fluid/wastewater, which is a function of the level of total dissolved solids (TDS) and contaminants in the fluid/wastewater. Highly conductive fluid, such as that resulting from oil and gas fracking, contains a high level of TDS and requires less voltage for plasma generation. Less conductive fluid, such as sewage, contains low levels of TDS and requires higher voltage supplied for plasma generation. For example, highly conductive fluid may include levels of 100,000 mg/L of TDS, and may only require 10 volts of three-phase AC power. Less conductive fluid may include levels of 800 mg/L of TDS, and may require 800 volts of three-phase AC power. The precise amount of voltage required will depend on the level of TDS and contamination in the fluid and may lie along a continuum.

Figure 7:
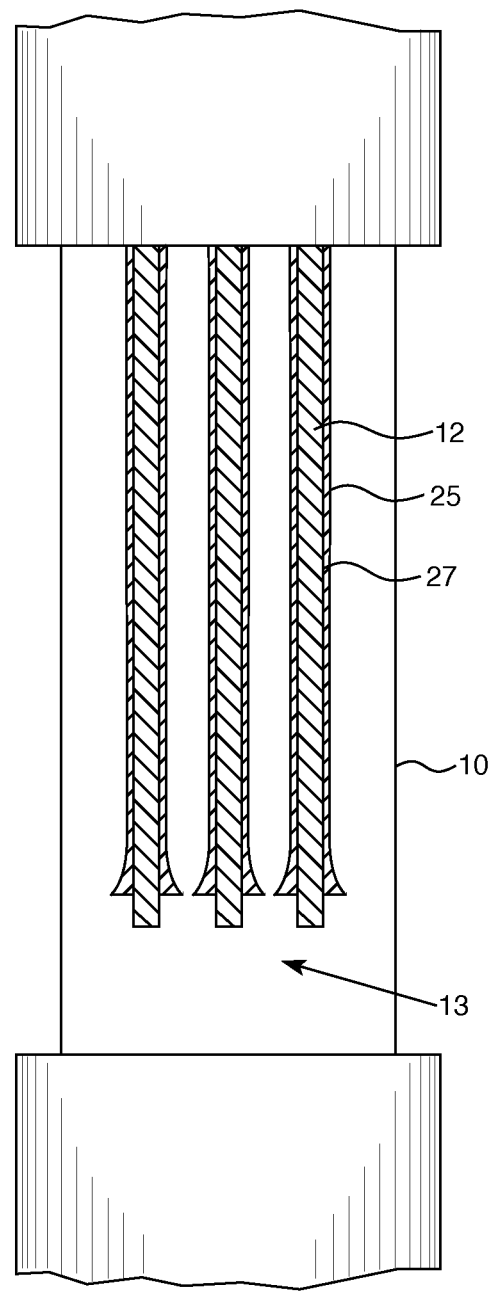
FIG. 7 is a partial cross-section of the embodiment of FIG. 6.
Figure 6:
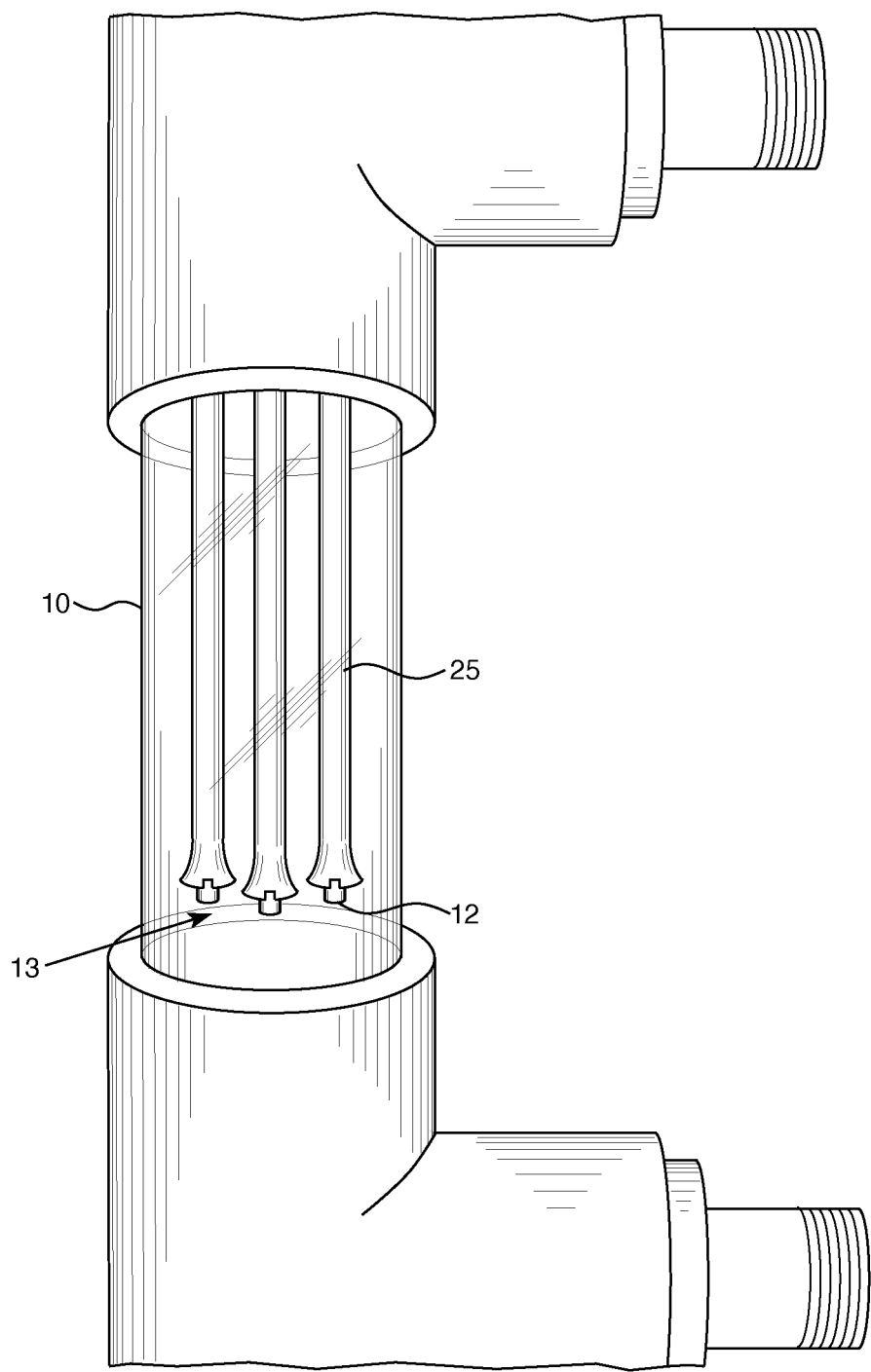
FIG. 6 is a front perspective view of another embodiment of the apparatus showing insulating material around the electrodes.

In some embodiments, each plasma producing electrode 12 may be at least partially surrounded by or wrapped in an insulating material 25, as depicted in FIGS. 6 and 7. The insulating material 25 is not electrically conductive and may be made of any suitable resistive material, such as, but not limited to, plastics, polytetrafluoroethylene (PTFE) such as Teflon®, resins, epoxies, and polymeric materials such as latex and acrylics. The insulating material 25 does not conduct the electrical charge, and therefore resists the passage of electricity there through. By surrounding at least a portion of the electrode 12 with insulating material 25, the insulating material 25 directs or focuses the electrical energy to the location(s) along the electrode 12 where insulating material 25 is absent. Accordingly, the insulating material 25 controls the amount of exposed electrode 12 for plasma generation. For instance, as shown in FIGS. 6 and 7, the insulating material 25 may be disposed as a sleeve around at least a portion of the length of each electrode 12. The insulating material 25 preferably does not extend the full length of the electrode 12, but leaves a portion of the electrode 12 exposed. In at least one embodiment, the insulating material 25 leaves the terminal end of the first end 13 of the electrode 12 exposed, leaving it free to contact the influent or contaminated wastewater for treatment. Thus, the energy is focused at the area of the electrode 12 not insulated with insulating material 25, such as the terminal first end 13 of the electrode 12. Focusing of energy keeps the plasma generation and discharge, as well as the donation of ions to the surrounding fluid during electrocoagulation, localized at a particular point or area.

The amount of exposed electrode 12 depends, in part, on the size or diameter of the electrode. For example, in embodiments where the electrode 12 is a cylindrical rod having a 6.4 mm diameter, the amount of exposed electrode at the first end 13 may be in the range of 30 to 40 mm$^2$, and may preferably be in the range of 32 to 38 mm$^2$, and still more preferably may be 32 mm$^2$. These are a few non-limiting examples, and it should be understood that as the size or diameter of the electrode increases or decreases, the preferable amount of exposed electrode 12 at the first end 13 would similarly increase or decrease accordingly.

The plasma discharge at the exposed electrode 12 burns and consumes the insulating material 25 at a consistent, predictable rate depending on the makeup of the material. In a preferred embodiment, when the voltage and power supplied is optimal, the insulating material burns at a rate of about 1 cm/hr, although the burn rate will vary depending on the particular material used, the method of wrapping the electrode and the content profile of the water. As the insulating material 25 burns away, it peels back and falls away from the electrode 12, exposing portions of the electrode 12 previously covered by insulating material 25. Since plasma generation occurs at the exposed electrode 12, the rate of plasma electrocoagulation may, in some respects, be controlled by the burn rate of the insulating material 25. But if, for instance, the voltage is increased, the insulating material 25 burns away more rapidly, and the electrode 12 also burns more rapidly. Conversely, if less voltage is supplied, the electrode 12 burns as plasma is produced, which retreats into the sleeve of insulating material 25 as the electrode burns away 12 inside. Eventually, a hole may form in the insulating material 25 as the plasma generated inside the sleeve overwhelms the resistive capacity of the insulating material 25. If the voltage and power supplied are optimized, however, a controlled burn rate of about 1 cm/hr is possible.

In some embodiments, the insulating material 25 may be scored, perforated, or cut, such as at the ends, to facilitate the peeling of insulating material 25 upon burning. For example, FIGS. 6 and 7 show electrodes 12 where the insulating material 25 has been scored at the ends corresponding to the first ends 13 of the electrodes 12. The depth or extent of scoring may vary, but is at least sufficient to begin start the peeling process and allow the insulating material 25 to peel away from the electrode 12 as it burns. This is optional, however, and in some embodiments the insulating material 25 is not scored.

The insulating material 25 may form a tight fit with the surface of the electrode 12, or it may be loosely associated with the electrode 12. For example, in one embodiment, a sealing layer 27 may be provided between the insulating material 25 and the surface of the electrode 12, to conform to the surfaces of the corresponding materials and provide a more complete connection for increased electrical insulation. For example, the sealing layer 27 may be made of glue, adhesive, gel, or other material that conforms to and forms a sealing engagement with the surfaces of the insulating material 25 and electrode 12 it is interposed between. Such sealing layer 27 material may be setting, flexible, thermosetting, thermoresistive, or other material as may be appropriate for the particular reactor and wastewater being treated.

As depicted in FIGS. 1 and 2, the reactor 10 may also include an influx port 16 in fluid communication with the interior space 11 of the reactor 10. The influx port 16 provides a point of entry for the influent 15, or fluid to be treated, to enter the reactor 10 for treatment by plasma electrocoagulation. The influx port 16 may connect in fluid communication with tubing, piping, hoses, conduit, or other similar structure used to transfer or move liquids, such as the wastewater. Similarly, the reactor 10 may also include an efflux port 18, also in fluid communication with the interior space 11 of the reactor 10, through which effluent 17, or fluid having been treated with plasma electrocoagulation, may exit the reactor 10. The efflux port 18 may also connect in fluid communication with tubing, piping, hoses, conduit, or other similar structure used to transfer or move liquids, such as wastewater. The reactor 10 may include any number of influx ports 16 and efflux ports 18 as may be desired or useful, depending on the particular requirements of a given site or treatment process. The influx port(s) 16 and efflux port(s) 18 may be located anywhere along the reactor 10.

In at least one embodiment, as in FIG. 1, the apparatus 100 may include a housing 19 that supports the reactor 10 for use and/or transport. The housing 19 may be a single unit, or it may be a plurality of units such as a top 21 and bottom 22 unit that collectively support the reactor from above and below, respectively. The housing 19 may at least partially surround or encase the reactor 10, or it may fully surround or encase the reactor 10 in other embodiments. Further, the housing 19 may be permanently affixed to the reactor 10, or it may be selectively attached to the reactor 10 to allow for temporary removal, such as when changing out the reactor 10, core 20 or electrode(s) 12 may be necessary.

For instance, the housing 19 may include at least one attachment point(s) 23a that may be used to affix portions of the housing 19 together, such as if a section is removable to access the reactor 10 or electrodes 12. The housing 19 may also include at least one other attachment point(s) 23b that may be used to secure the housing 19 to a support member 26, such as a skid or platform, to enable transport of the apparatus 100 from one location to another. The attachment points 23a,b may be any type of attachment structure, such as but not limited to screws, bolts, nuts, washers, clamps, O-rings, adhesive, and any combination thereof, and may be permanent or selectively reversible.

The housing 19 may also have at least one aperture 24 through which the electrodes 12 or core 20 extend, to permit electrical connection with the power supply external to the reactor 10. There may be one aperture 24 for the entire core 20, or there may be a plurality of apertures 24, one for each electrode 12 extending through the housing. This aperture(s) 24 may be located anywhere along the housing 19, such as on the top, bottom, or side of the housing 19. In at least one embodiment, the aperture(s) is located at the top of the housing 19. In at least one other embodiment, the aperture(s) is located at the bottom of the housing 19. In other embodiments, however, the housing 19 may include the electrical lead for connection to the power supply, such that the electrodes 12 terminate in the housing 19 and do not extend there through. In such embodiments, the housing 19 need not include an aperture(s) 24.

The present invention is also directed to a system 200 for treating fluid, such as wastewater, with plasma electrocoagulation (PEC) using the apparatus 100 described above. The system 200 is preferably a flow through system where fluid/wastewater flows continuously through the system 200, including through the reactor 10 during treatment with plasma electrocoagulation. However, the apparatus 100 may also be used for batch treatment where discrete volumes of wastewater are treated one at a time.

Figure 8:
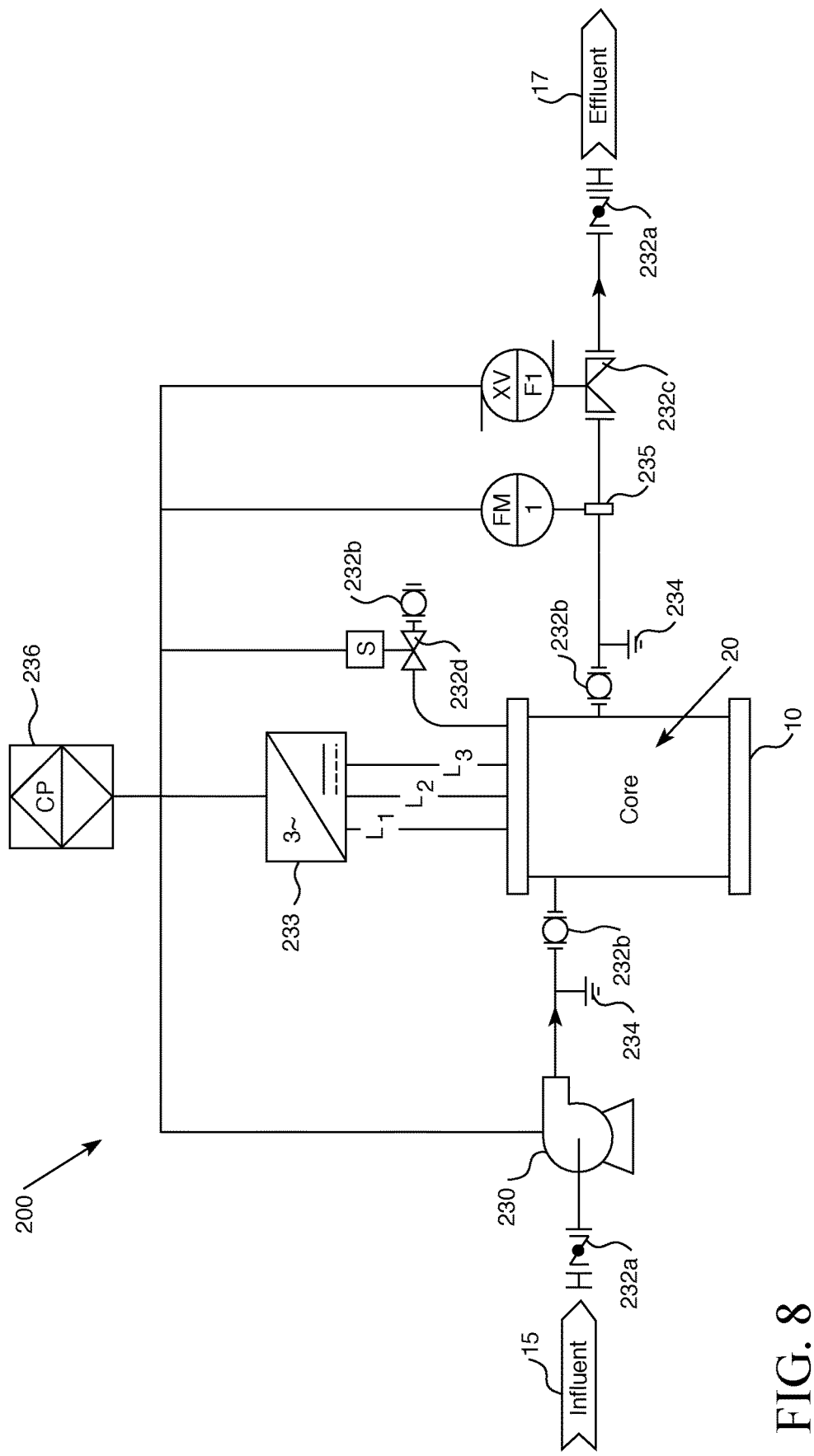
FIG. 8 is a schematic diagram of one embodiment of the system for electrocoagulation using plasma discharge, showing a single pass flow-through system.
Figure 11:
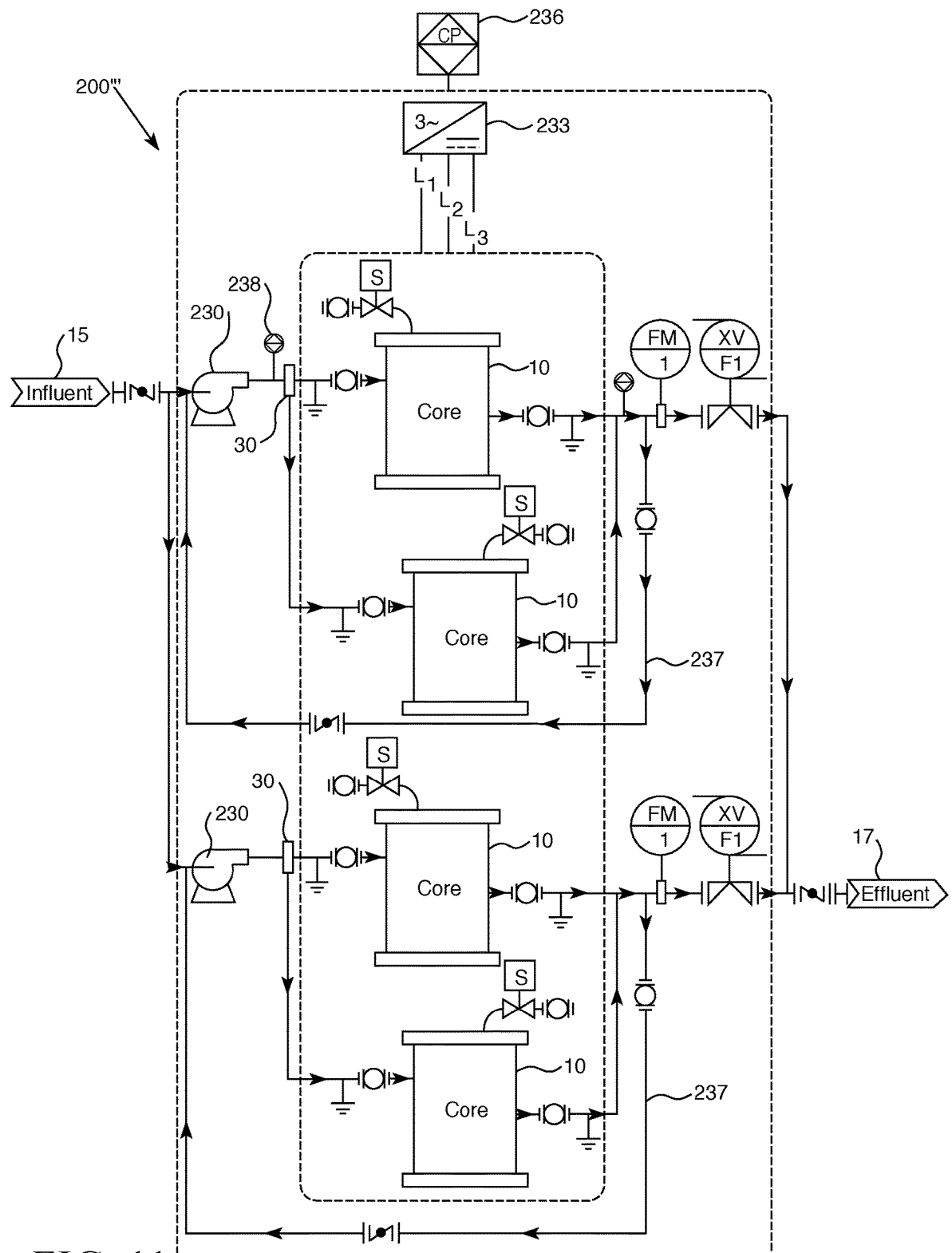
FIG. 11 is a schematic diagram of another embodiment of the system for electrocoagulation using plasma discharge, having a recirculation loop with multiple pumps and multiple reactors.

As shown in FIG. 8, the system 200 begins with influent 15, which may enter the system 200 from a holding tank or may come directly from a source of fluid/wastewater, such as manufacturing run-off, fracking fluid directed from the fracking site, or oil or gas refinery by-product. The system 200 includes at least one pump 230 that, when activated, draws influent 15 or wastewater into the system 200 for treatment. The pump 230 is also responsible for moving the fluid through and ultimately out of the system 200 as effluent 17. The pump 230 may be any type of pump that is suitable for moving volumes of fluid, including large volumes of fluid, such as rotary pumps, peristaltic pumps, reciprocating pumps, and other positive or negative displacement pumps. In at least one embodiment, the pump 230 is preferably a centrifugal pump capable of pumping rates of up to 500 gal/min, although greater pumping rates are also contemplated herein. The pump 230 may operate in an on/off manner, or may have various settings to control the operation, such as rate or volume of pumping, pressure, or power level. In some embodiments, as depicted in FIG. 11, multiple pumps 230 may be included in various parts of the system 200 to keep the fluid moving through, and may be different types of pumps or the same type of pump. In at least one embodiment, however, a single pump 230 moves the wastewater through the entire system 200.

Figure 10:
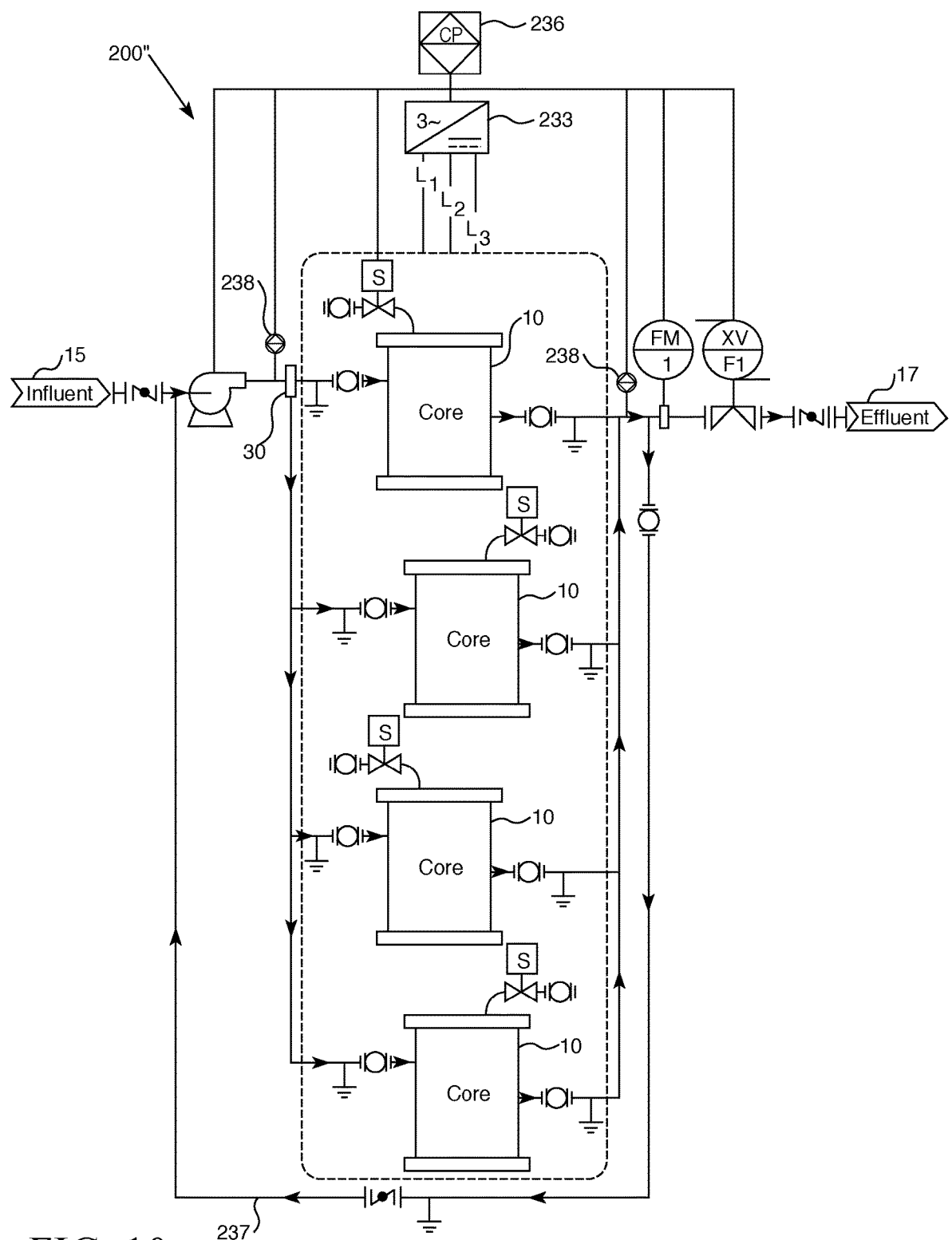
FIG. 10 is a schematic diagram of another embodiment of the system for electrocoagulation using plasma discharge, and including a recirculation loop.

The pump 230 draws fluid or influent 15 into the system and drives it into the reactor 10, where the wastewater is subject to plasma electrocoagulation by the electrodes 12 in the core 20. In some embodiments, as shown in FIG. 10, the system 200" includes a plurality of reactors 10 that share a common header 30, which is in fluid communication with a single pump 230. The pump 230 may operate at a greater pumping rate than the flow rate of wastewater through each reactor 10. For example, the pump 230 may operate at 2000 gal/min, and each reactor 10 has wastewater flowing through at rates of 500 gal/min. The multiple reactors 10 may each have the same flow rate, or may have different flow rates. They may also share a common header 30, or may connect in subgroups through multiple headers 30, as seen in FIG. 11, or may connect directly to the pump 230. In further embodiments, as in FIG. 11, the system 200" may include multiple pumps 230 and multiple reactors 10. Any combination of number of pumps 230 and reactors 10 is contemplated herein, as may be desired for particular situations.

The system 200 also includes a power source 233 that is electrically connected to the reactor 10, such as to the electrodes 12 of the core 20, and provides electrical energy to the electrodes 12 for the generation of plasma. As discussed above, the power source 233 may be any form of generator and may generate any form of power, such as DC or AC power, which may be single phase or multi-phase. For example, in the embodiment of FIG. 8, three-phase AC power is supplied by the power source 233, where L1 indicates the first phase power electrically communicated to the electrodes 12 receiving the first phase of power, L2 indicates the second phase power electrically communicated to the electrodes 12 receiving the second phase of power, and L3 indicates the third phase power electrically communicated to the electrodes 12 receiving the third phase of power. Also as previously discussed, the electrical energy may be supplied as power, voltage, and/or current, any one of which may be set at a constant level depending on the intended parameters, and the others vary accordingly. Once treated in the reactor 10, the fluid/wastewater is moved out of the reactor 10 by the pump 230 and out of the system 200. After treatment, the fluid/wastewater is generally referred to as effluent 17.

The system 200 may also include at least one, but preferably a plurality of valves 232 disposed along the fluid flow path of the wastewater through the system 200. The valves 232 regulate the flow of the wastewater, depending on the degree to which the valve is opened or closed. The valves 232 may be fully or partially open or closed as needed to coordinate with the pump 230 for the movement of the wastewater through the system 200 as desired. Further, the valves 232 may be any type of valve appropriate for regulating fluid flow, such as but not limited to butterfly valves 232a, ball valves 232b, flow control valves 232c, and solenoid valves 232d, as depicted in FIG. 8. However, it should be appreciated that other types of valves 232 may be used, and the various types of valves 232 may be used at any point or location along the fluid flow path of the wastewater. It should also be appreciated that different types of valves 232 may be used within the same system 200, or the valves 200 may all be of the same type. The valves 232 may be manually operated or mechanically operated, and may be programmed or automated.

As shown in FIG. 8, in at least one embodiment, the system 200 includes a valve 232 upstream of the pump 230 through which influent 15 enters and is directed through the pump 230. This valve may be a throttle valve 232a, such as a butterfly valve, that may be either fully open or fully closed depending on the setting for the valve 232a. Another valve 232 may be present between the pump 230 and the reactor 10, to regulate the amount of wastewater entering the reactor 10. This valve may be an isolation valve 232b, such as a ball valve, that also may be either fully open or fully closed depending on the setting. Another isolation valve 232b may be present downstream of the reactor 10 to regulate the flow of wastewater out of the reactor 10. Accordingly, isolation valves 232b may be positioned immediately upstream and downstream of the reactor 10 to close the circuit of fluid flow before and after the reactor 10 when needed. For instance, isolation of the reactor 10 may be desirable to allow for access into the reactor 10, for cleaning and/or removal or replacement of electrode(s) 12, or the entire core 20, as they become consumed or exhausted from the plasma electrocoagulation process. The electrodes 12 may be removable individually or as a group, such as in multiples of three when three-phase power is being used. In other embodiments, the entire core 20 comprising all the electrodes 12 may be removable as one piece. Once repair, replacement, cleaning, maintenance, or other access is complete and the reactor 10 is once again assembled and ready for use, the isolation valves 232b may be opened to restore fluid flow through the system 200.

Still another valve 232 may be present in the system 200 to control the flow of the wastewater through the system 200. This valve may be a flow control valve 232c, such as an automated or actuated flow control valve as described in U.S. patent application Ser. No. 14/808,891, which is incorporated by reference herein in its entirety. The flow control valve 232c may be located anywhere in the system 200, although in at least one embodiment it is located downstream of the reactor 10. The flow control valve 232c may be partially opened, such as opened by degrees or along a continuum, rather than simply being fully open or closed. The flow control valve 232c may also be connected to or otherwise configured to receive signals from a flow meter 235, also present in the system 200 that detects and monitors the rate of flow of wastewater through the system 200. Depending on the signals or information on flow rate provided by the flow meter 235, the flow control valve 232c may be further opened or closed by degrees to control the rate of flow of wastewater through the system 200 overall.

The system 200 may also include a venting valve 232d for venting or releasing gases or pressure from the system 200 and/or reactor 10. In at least one embodiment, the venting valve 232d may be a solenoid valve, although other similarly acting valves are contemplated. The venting valve 232d may be used to release vapors or gases that may evolve in the reactor 10 during the electrocoagulation process. It provides a way to remove these vapors from the system 200 without disrupting the flow of wastewater, and so keeps pressure from building up within the system 200. It may also be connected to an air break, or may exit to the atmosphere.

Although specific valves are described above in particular locations within the system 200, it should be appreciated that any number and type of valve may be included at any location in the system 200 according to its function and desired use. FIG. 8 presents just one non-limiting example of an arrangement of valves 232 that can be used.

The system 200 may also include any number of sensors 238 to detect various characteristics of the system 200, such as but not limited to pressure, temperature, voltage, amperage, and current. These sensors 238 may be located anywhere throughout the system 200. For example, as seen through FIGS. 9-11, pressure and temperature sensor(s) 238 may be located anywhere in the system 200, such as upstream, downstream, or at the reactor 10 to monitor the progress and efficacy of the plasma electrocoagulation occurring in the reactor 10. For example, the sensor(s) 238 may be used to monitor the system 200 for excessive temperatures or pressures. Sensor(s) 238 may be located in proximity to a valve 232d and used to monitor the pressure of the system 200 and provide information for determining when to vent the system 200. Still other sensor(s) 238 may be located in the power source 233 or downstream of the power source 233 and used to monitor voltage, amperage, current, and/or the amount of power being supplied to the electrodes 12 of the core 20 for plasma electrocoagulation. Sensor(s) 238 may also be located at or in the reactor 10 for monitoring power, voltage, amperage, and/or current at the core 20.

In at least one embodiment, as shown in FIG. 8, the system 200 also includes a control panel 236 that is in electrical communication with at least the power source 233, but may also be in connection with the flow meter 235, the valve(s) 232, the pump 230 and the various sensors that may be present. The control panel 236 may include an interface where an operator can input information to the system 200, such as setting the amount of power, current, or voltage to be supplied to the electrodes 12. The control panel 236 is electrically connected to the various components of the system 200 to send relevant information to each component for operation. For example, signals from the control panel 236 to the power supply 233 direct the level and/or type of power generated and sent to the electrodes 12. The pressure or flow rate for the system 200 may also be set at the control panel 236, which is then communicated to the pump 230 and valves 232, such as the flow control valve 232c and venting valve 232d. The control panel 236 may also receive signals from the various components of the system 200, such as the sensors and flow meter 235 that provide information on the status of the system 200. The control panel 236 may have logic circuits or other appropriate electrical structure that interprets the signals and provides this information on a read-out display for viewing by an operator and/or adjust the parameters of the signals being sent from the control panel 236 to the various components of the system 200, such as to make adjustments in real-time to maintain the desired settings for the system 200 operation. FIG. 8 shows one control panel 236 in the system 200 coordinating with the various components, although multiple control panels 236 may be present, and may preferably be linked together for coordinating monitoring and control.

Once the fluid/wastewater has traveled through the reactor 10 and has been treated with plasma electrocoagulation, it exits the system 200 as effluent 17, as shown in FIG. 8. Flocculent formation, clarification and sedimentation begin to occur as soon as plasma is generated in the fluid during treatment and/or electrocoagulation begins in the fluid, and may continue over time. For example, plasma electrocoagulation as described herein produces visibly clear water with no floating material in as little as 2-4 minutes, as compared to 20-30 minutes to achieve the same level of clarification from standard electrocoagulation methods under comparable conditions. Therefore, in at least one embodiment the effluent 17 may be used directly following exit from the system 200, and may be routed to appropriate systems or facilities as desired. In at least one embodiment, however, the effluent 17 may be transferred to tanks for further processing, such as filtration of the floc from the clarified effluent 17. PEC floc has been found to be more amenable to filtration than standard EC floc in that it is much more resistant to extrusion through a filter membrane than is standard EC floc. Such secondary or tertiary processing is not always necessary, but may be beneficial in some embodiments. In other embodiments, the effluent 17 may be transferred to a holding tank upon exiting the system 200, to allow the floc to sediment and settle to the bottom. Such holding tank may include settling plates or other structure to facilitate the formation and separation of the floc from the effluent 17. In still other embodiments, the effluent 17 may be transferred first to a holding tank and then passed on for secondary or tertiary processing, such as filtration.

It has been found that in some instances, stray voltage can exist in the wastewater at some distance away from the electrodes during treatment. Therefore, in at least one embodiment, the system 200 may further include at least one ground 234 located downstream of the reactor 10. The ground 234 may be a solid copper ground wire or other electrically conductive grounding material, where one end is disposed into the stream of wastewater flowing through the system 200, and the opposite end runs to ground. The ground 234 may therefore pick up any stray voltage remaining in the wastewater away from the electrodes during treatment, and safely discharge it.

For fluid with lower levels of TDS, and therefore lower conductivity, it may be beneficial to increase the retention time of the wastewater in contact with the electrodes 12 for plasma electrocoagulation. This may be referred to as "contact time" or "retention time." One way to increase contact time is to decrease the flow rate of the system 200, either by input at the control panel 236 or at the flow control valve 232c. In other embodiments, such as depicted in FIG. 10, the system 200' may be as previously described, but may further include a recirculation loop 237 where a portion of the wastewater in the reactor 10 is recirculated back into the reactor 10 for additional plasma electrocoagulation treatment. The pump 230 may move the fluid/wastewater through the recirculation loop 237 as well as through the rest of the system 200' as described previously. Further, in one embodiment, the control panel 236 provides instructions directing how much fluid/wastewater is directed into the recirculation loop 237 for increased treatment or retention time in the reactor 10. In other embodiments, the flow control valve 232c may control the flow rate for the entire system 200', and may also direct the amount of wastewater to be directed into the recirculation loop 237. In at least one of these embodiments, the flow control valve 232c works in conjunction with the control panel 236 to determine and direct the amount of wastewater passed into the recirculation loop 237 for further treatment.

Figure 9:
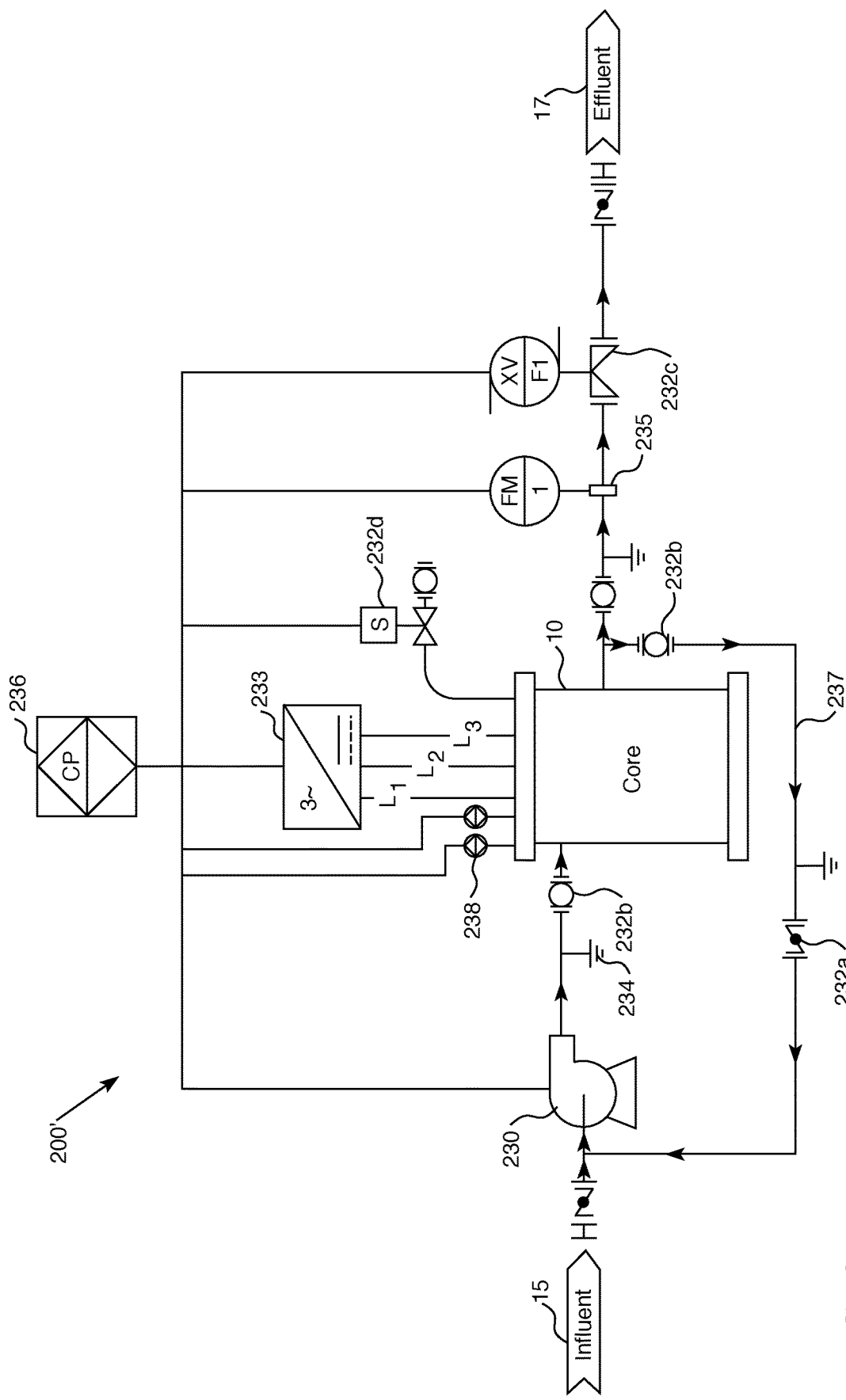
FIG. 9 is a schematic diagram of another embodiment of the system for electrocoagulation using plasma discharge, and including multiple reactors and a single pump.

The recirculation loop 237 may include at least one valve 232, such as a throttle valve 232a, to throttle or adjust the recycle rate, if necessary. The recirculation loop 237 may also include an isolation valve 232b, such as a ball valve, immediately downstream of the reactor 10 to close off the recirculation loop 237 in the event of maintenance or repair. In addition, the recirculation loop 237 may include a ground 234 downstream of the reactor 10 to discharge stray voltage. Since some wastewater exiting the reactor 10 will be recirculated back into the reactor 10 in this embodiment of the system 200', the conduit or piping upstream of the reactor 10 may also include a ground 234 to discharge stray voltage, as seen in FIG. 9.

The present invention is also directed to a method of treating wastewater with plasma electrocoagulation utilizing the apparatus and system described above. In at least one embodiment, shown in FIG. 12, the method 300 begins with contacting fluid with electrodes, as at 310. The fluid is any liquid, such as wastewater, that is desired to be treated with plasma electrocoagulation for clarification and/or purification. As noted above, it may be the result of the fracking process, industrial or manufacturing processes, oil or gas processing and refining, municipal water such as sewage, and any other fluid that may be contaminated or in need of clarification and/or purification. It may be influent 15, which may come directly from a process or from a holding tank, or it may come from the recirculation loop 237 discussed above, or may be a combination of both. In addition, the fluid may have any level of contaminants or TDS, and may include organic, inorganic, mineral and other contaminants.

Regardless of the source, the step of contacting fluid with electrodes, as at 310, involves transferring the fluid into the reactor 10 so as to come into contact with the electrodes 12 therein. The fluid may be introduced into the reactor 10 from the top, bottom, and sides of the reactor 10, and may enter from one point or multiple points. The fluid may be entirely influent, or may be a combination of influent and recirculated wastewater from recirculation loop 237. The fluid is added to the reactor 10 so that at least the portion of the electrodes 12 where plasma generation occurs is in contact the fluid. In at least one embodiment, at least the terminal ends 13 of the electrodes 12 are in contact with the fluid. In other embodiments, portions of the length of the electrodes 12 are also in contact with the fluid. In at least one embodiment, contact of the fluid with the electrodes 12 includes at least partially submerging the electrodes 12 where plasma generation will occur, such as the terminal ends 13, in the fluid. In other embodiments, contacting the fluid with the electrodes 12 may be accomplished by passing or running the fluid over the electrodes 12.

The method 300 further includes applying electrical energy to the electrodes sufficient to generate plasma discharge in the fluid, as at 320. As described previously, the electrical energy is supplied to the electrodes from a power source 233, such as a generator, which may provide electrical energy in any form, such as DC or AC current, and may be single phase or multi-phase. In at least one embodiment, applying electrical energy 320 includes applying three-phase AC current to the electrodes 12 in the reactor. In embodiments where the electrodes 12 receiving the same phase of power are electrically connected in parallel, then applying electrical energy 320 includes applying electrical energy of each phase simultaneously to each of the electrodes 12 configured to receive that phase of power.

Applying electrical energy to the electrodes 320 includes supplying a sufficient level of energy to generate plasma. For instance, in at least one embodiment it has been found that supplying between 10-800 volts of three-phase AC power to a three electrode system spaced 2 cm apart generates 7 amps of power at the core 20 will generate plasma in fluid. Highly conductive fluid, such as fluids containing around 100,000 mg/L TDS or more which may be comparable to fracking solution for example, requires less voltage to achieve plasma generation (about 10 volts). Fluid that is less conductive, such as having TDS levels of about 800 mg/L for example such as in sewage, requires higher levels of voltage to produce plasma (about 800 volts). For comparison, current methods of non-plasma electrocoagulation utilize less than 10 Volts of DC power. Electrical energy can be applied along a continuum of power, voltage, or current.

Figure 13:
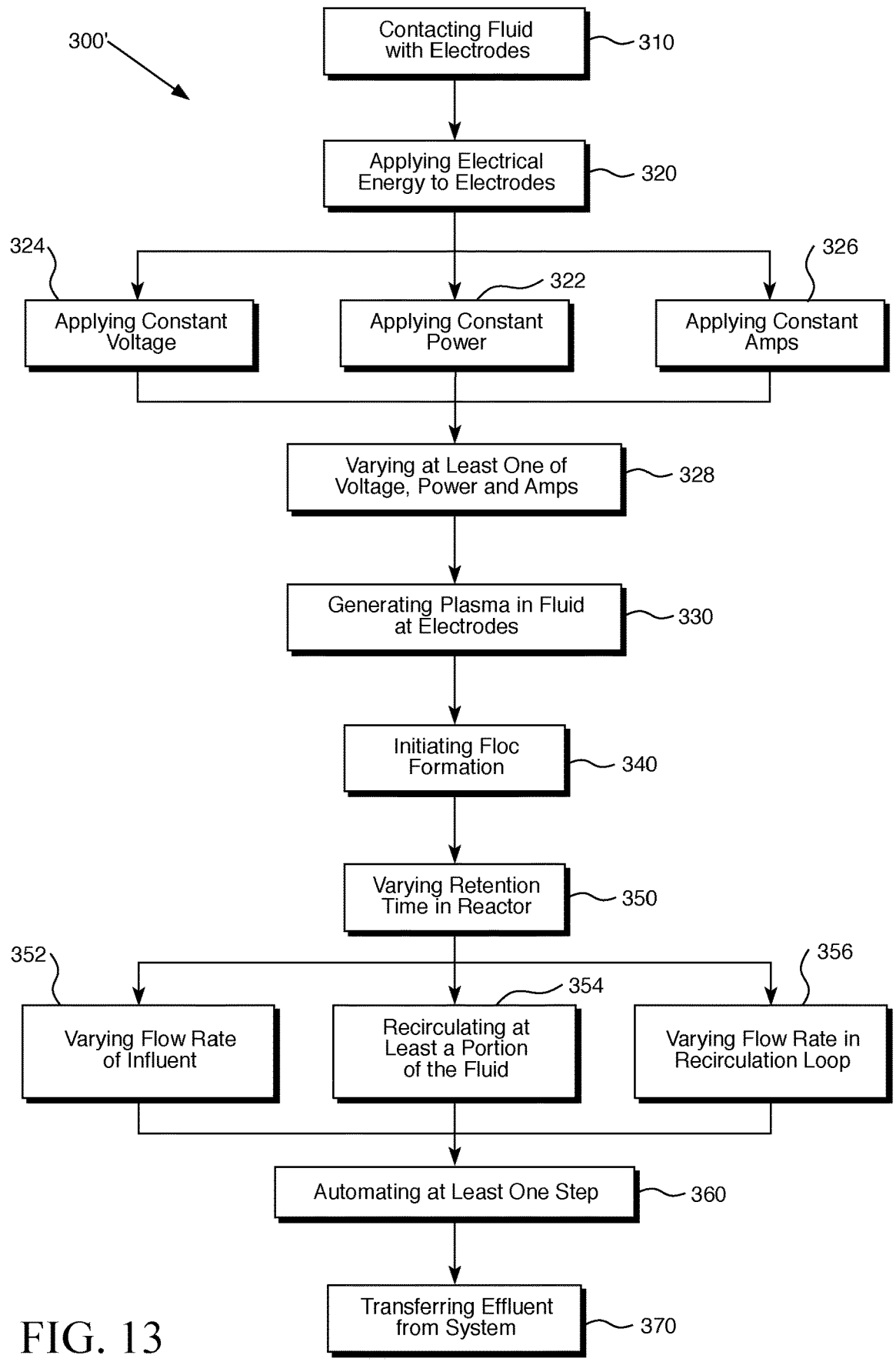
FIG. 13 is a schematic diagram of another embodiment of the method for electrocoagulation using plasma discharge Like reference numerals refer to like parts throughout the several views of the drawings.

In some embodiments, as shown in FIG. 13 the method 300' may include a step of applying a constant level of power to the electrodes, as at 322. The level of power, such as in kilovolt-amps (KVA), can be set by an operator by input to the control panel 236 discussed previously. Sensors will monitor the system 200, 200' during use and provide information to the control panel 236 on the levels of power, voltage, and current of the system. Setting and applying a constant level of power, as at 322, may be desirable to control the wattage drain on the power source 233. For instance, a constant level of power may be applied to the electrodes in a range of 150 VA to 1 MVA. In some embodiments, constant power may be set in the range of 1 to 10 kVA. In a further embodiment, the constant power is set at 2 kVA. In another embodiment, the constant power is set at 10 kVA. The precise level of power provided will depend on a number of factors, such as but not limited to the number, spacing and configuration of the electrodes, the TDS or conductivity of the fluid being treated, the flow rate through the system, and other factors.

In other embodiments, the method 300' includes the step of applying a constant level of voltage to the electrodes, as at 324. Specifically, in at least one embodiment, applying a constant level of voltage, as at 324, includes applying a constant level of voltage anywhere along a continuum ranging from 10-800 volts. The particular level of voltage set will depend on a number of factors, such as the conductivity or TDS of the fluid, the number, size and spacing of the electrodes, to name just a few parameters. For instance, in a 3-electrode core 20 where the electrodes are spaced 2 cm apart in an equilateral triangle configuration, and three phase AC power is supplied, the voltage may be set at 10 volts for highly conductive fluid having high TDS levels (such as 100,000 mg/L), such as is comparable to fracking solution. Under the same conditions but treating low conductivity fluid, having low TDS levels (such as 800 mg/L) as in sewage, a constant voltage of 800 volts may be needed. The voltage may be set higher or lower than as stated above depending on the particular specifics of a given system. The voltage level can be set by an operator at the control panel 236, as discussed previously, and sensors throughout the system 200, 200' monitor the levels of power, voltage, and current.

In still other embodiments, the method 300' includes the step of applying a constant level of current to the electrodes, as at 326. The current may be set at any point in the range of 5-500 amps, depending on the number, size and spacing of the electrodes, among other aspects. For instance, the more electrodes 12 present in the core 20, the higher the current may be. In embodiments using 3 electrodes, the optimal current is in the range of 7-9 amps. When using 9 electrodes, the optimal current is 21-27 amps. When using 30 electrodes, the optimal current is in the range of 70-90 amps. The spacing also impacts the level of current. For instance, when using 3 3 electrodes that are spaced 1.25 cm apart equilaterally, the optimal current is 6 amps. If spaced 3 cm apart equilaterally, the optimal current is 10 amps. If spaced 2 cm apart equilaterally, the optimal current is 7 amps.

As electrocoagulation proceeds and ions from the electrodes are donated to the fluid being treated, and reactions occur in the wastewater to purify and clarify the fluid from contaminants, the ionic character of the wastewater will change. The amount of electrical energy needed to sustain plasma generation and discharge will thus vary over time as the plasma electrocoagulation progresses. Therefore, the method 300' may further include the step of varying at least one of the voltage, power and current, as at 328. Because of the relationship between these aspects of energy defined in the equation above, when one component is held constant, the other components will vary up or down accordingly. For example, if constant power is applied, as at 322, the voltage and current may vary. When constant voltage is applied, as at 324, the power and current may vary. When constant current is applied, as at 326, the power and voltage may vary. The step of varying at least one of the voltage, power and current, as at 328, therefore refers to varying any one or two of these components in relation to the third. In some embodiments where a constant level of power, voltage or current is not applied, any of these components may be varied.

Figure 12:
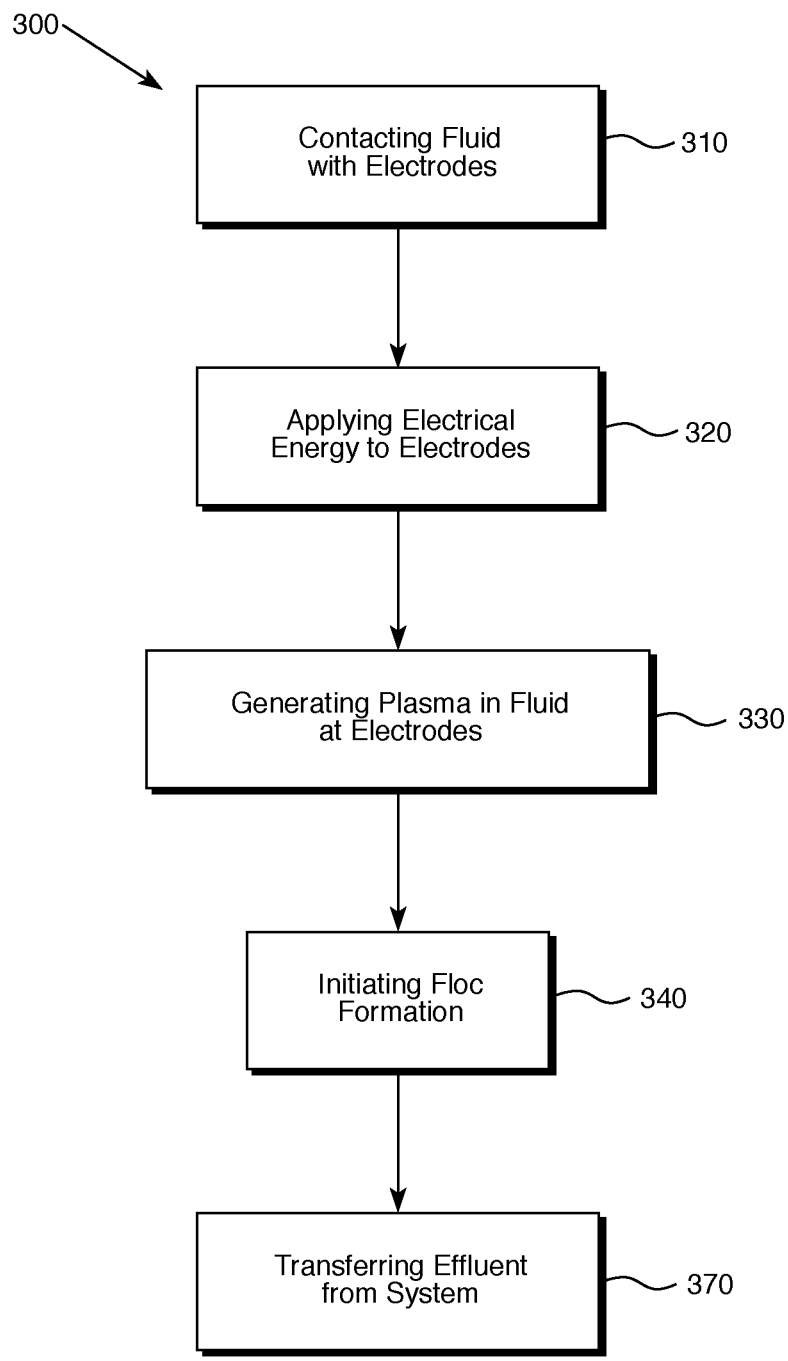
FIG. 12 is a schematic diagram of one embodiment of the method for electrocoagulation using plasma discharge.

With reference to FIG. 12, the method 300 continues with generating plasma in the fluid at the electrodes, as at 330. Generating plasma includes the creation and discharge of plasma into the surrounding environment, in this case fluid/wastewater being treated. In some embodiments, the plasma may be discharged as a corona, or plasma glow, between or around the electrodes 12. In other embodiments, the plasma may be discharged as a plasma arc connecting between points on electrodes 12. In some embodiments, there may be combinations of corona and plasma arc discharge in the same reactor 10 during the same treatment session. Typically, corona glow requires less energy and work more slowly, whereas plasma arcs require more energy and work more quickly. Both are effective at initiating floc formation and clarification in wastewater, however, and one or the other may be preferable depending on the solution being treated. For example, highly conductive fluid is very receptive to plasma electrocoagulation and may be quickly clarified using less energy and employing plasma corona or glow, which does not degrade the electrodes 12 as quickly. Low conductivity fluid may take more energy, such as plasma arcing, to achieve a comparable level of clarification in the same amount of time. The balance of energy needs and electrode degradation should be balanced and considered with the level of conductivity of the solution and the energy available for plasma electrocoagulation.

Notably, it is the electrocoagulation electrodes 12 that generate the plasma discharge. This is different from other plasma generation systems where electrocoagulation occurs separately from plasma creation and discharge. In at least one preferred embodiment, the plasma discharge occurs at the terminal ends 13 of the electrodes 12 that are in contact with the fluid. However, in other embodiments, the plasma discharge may occur at any point(s) along the electrodes 12, which may preferably be exposed from any insulating material 25 covering the electrode, although this is not necessary. For instance, plasma generation may still occur within the insulating material 25, such as if the insulating material 25 is spaced apart from the electrode 12 surface, or if the insulating material 25 is burning slower than the electrode 12 and plasma generation occurs within the sleeve of the insulating material 25. While this is not optimal, it may occur.

It is also notable that plasma discharge has not been done before in conjunction with electrocoagulation. In standard electrocoagulation, care is taken to avoid excessive voltage or power. Any sparking is seen as a system failure, and the power sources typically employed in standard electrocoagulation include an automatic shut-off as a safety measure. The present apparatus 100, systems 200, 200', 200". 200''' and methods 300, 300' provide ways to harness the additional energy needed for plasma generation to use this energy to perform electrocoagulation. This provides a much more effective and efficient electrocoagulation process than previously seen.

In addition, generating plasma in the fluid at the electrodes, as at 330, specifies that the plasma generation and discharge occurs in the wastewater being treated with electrocoagulation. The plasma generation and discharge, terms which may be used interchangeably herein, does not occur in a gaseous environment in the system, but rather occurs within the liquid phase which may vaporize as a result of the plasma being generated in the wastewater being treated. This is a break from other plasma generation techniques.

The method 300 continues with initiating flocculant formation in the fluid as a result of plasma electrocoagulation, as at 340. The flocculent, or "floc," formed is made of the solids that are produced from the reactions caused by plasma electrocoagulation between the charged ions donated from the electrodes 12 and charged particles from the application of energy with the minerals, organics, inorganics, and other contaminants within the fluid. For example, when aluminum electrodes 12 are used, aluminum oxides may form upon reaction with the wastewater, and sediment out as floc. Free radicals and reactive species generated by the plasma may also react with the contaminants in the fluid to form floc, and may also interfere with cell walls and/or DNA of biological material such as microorganisms to have an antimicrobial effect.

In some embodiments, the method 300 may include a single pass of the fluid through the reactor 10 for plasma electrocoagulation treatment. In such embodiments, the method 300 may continue with transferring the effluent (or treated fluid) from the system, as at 370. From here, it may be transferred directly for reuse, or to a holding tank to allow clarification to occur, and/or to secondary or tertiary processing steps, such as filtration to remove the floc from the clarified fluid.

However, in some embodiments it may be beneficial to have increased contact time between the fluid and the plasma discharge for electrocoagulation, such as if electrical energy must be minimized due to system constraints, or if the conductivity of the fluid is low. Therefore, in some embodiments, the method 300' may further include varying the retention time of the wastewater in contact with plasma discharge, as at 350 in FIG. 12. As used herein, "contact time" and "retention time" may be used interchangeably to mean the amount of time the wastewater is in contact with the plasma during electrocoagulation. It may also refer to the amount of time fluid is in contact with at least a portion of the electrodes 12 of the core 20, which may be more easily determined than contact with plasma discharge. It is to be understood that the amount of time wastewater is in contact with at least a portion of the electrodes 12 of the core 20 may therefore be used as a proxy for the amount of time the wastewater is in contact with the plasma during electrocoagulation, since plasma discharge occurs at the electrodes 12. The step of varying the retention time of the fluid in contact with plasma discharge, as at 350, may include increasing or decreasing the retention time, but in at least one embodiment includes increasing the retention time. If increased retention time is desired, the flow rate of wastewater through the system 200, 200', 200", 200''' may be decreased or slowed, to permit additional time for the wastewater to contact the electrodes 12 and plasma discharge in the reactor 10. Conversely, if retention time is too long, it may be shortened by increasing the flow rate of wastewater through the system 200, 200', 200", 200'''.

Varying the retention time, as at 350, may be accomplished in a number of ways. For example, it may include varying the flow rate of influent, as at 352. The amount or rate of contaminated fluid entering the system 200, 200' may be controlled by a flow control valve 323c as described above, or by the control panel 236 dictating the flow rate to the pump 230. It may also be adjusted by adjusting a throttle valve 232a to increase or decrease the amount of fluid passing through the valve 232a. Valve adjustment may occur manually or through control panel 236 oversight and/or control.

In some embodiments, varying the retention time, as at 350, includes recirculating at least as portion of the fluid from the reactor, as at 354. Recirculating may occur by directing at least a portion of the wastewater from the reactor 10 into the recirculation loop 237 of FIG. 10. Any volume or amount of the fluid, including up to 100% of the fluid, may be directed into the recirculation loop 237. As is evident from the system 200' depicted in FIG. 10, recirculating fluid from the reactor through the recirculating loop 237 results in the recirculated water traveling through the recirculation loop 237 and ultimately back into the reactor 10. Therefore, recirculating at least a portion of the fluid from the reactor, as at 354, results in the recirculated fluid returning to the reactor 10 and contacting the electrodes 12 and plasma discharge again for another round of plasma electrocoagulation. In this manner, retention time is increased through repetitive passes in the reactor 10. In at least one embodiment, the flow control valve 232c may dictate the amount of wastewater exiting the system 200' as effluent, with the balance being directed into the recirculation loop 237. In other embodiments, the directions for controlling the amounts or ratio of exiting effluent and recirculating fluid may come from the control panel 236 or even manual controls in some instances. The flow meter 235 and/or sensors 238 throughout the system 200' may provide information on the efficacy of the plasma electrocoagulation treatment, such as TDS levels of the wastewater downstream of the reactor 10, that may provide information to the control valve 232c and/or control panel 236 to determine amounts or ratio of exiting effluent and recirculating fluid.

Returning to FIG. 12, in further embodiments, varying the retention time, as at 350, includes varying the flow rate in the recirculation loop, as at 356. In at least one embodiment, the flow rate through the recirculation loop 237 is the same as the flow rate in the rest of the system, since a single pump 230 is responsible for moving all the wastewater through the system 200'. However, in some embodiments it may be possible to vary the flow rate in the recirculation loop 237 independently of the rest of the system, such as if the recirculation loop 237 has a separate pump or if a throttle valve 232a in the recirculation loop 237 is adjusted. Further, it may be beneficial to recirculate and reprocess wastewater already in the system before adding new influent to the system. Therefore, in some embodiments, varying the flow rate in the recirculation loop, as at 356, may include throttling the rate of influent, such as by adjusting a throttle valve 232a at the influent port.

It should also be appreciated that varying the retention time, as at 350, may include a combination of varying the flow rate of influent, as at 352; recirculating at least a portion of the wastewater from the reactor, as at 354; and varying the flow rate in the recirculation loop, as at 356.

In at least one embodiment, the method 300' may also include automating at least one of the varying steps, as at 360. Specifically, any of the steps of varying at least one of power, voltage and current, as at 328; varying the flow rate of influent, as at 352; recirculating at least a portion of the fluid from the reactor, as at 354; and varying the flow rate in the recirculation loop, as at 356. The automation process may occur in conjunction with, and as directed by, the control panel 236, and may be used to adjust the energy settings, flow rate, pressure, or other parameters in order to optimize the plasma electrocoagulation process or adjust to changes occurring in the fluid during plasma electrocoagulation treatment. For example, as the plasma electrocoagulation process proceeds and floc forms and separates from the wastewater, the conductivity level of the wastewater may decrease as fewer contaminants remain dissolved in the wastewater. Accordingly, as the conductivity levels fall, the voltage or power will need to be increased to compensate and maintain a consistent level of electrocoagulation. Necessary adjustments to the system 200, 200', 200". 200"' may be made manually by an operator, but preferably may be performed automatically, such as by the control panel 236 based on information received from the sensors and flow meter 235.

Once sufficient levels of electrocoagulation are achieved, the methods 300, 300' include transferring the effluent from the system, as at 370. The effluent is defined as the fluid/wastewater following treatment with plasma electrocoagulation, and includes floc formed or in the process of forming and clarified water.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. A method of treating fluid with plasma, comprising:
   contacting fluid within a reactor with at least a portion of at least one plasma producing electrode;
   applying alternating current (AC) electrical energy to said at least one plasma producing electrode sufficient to generate plasma discharge in said fluid within said reactor;
   generating sustained plasma discharge from said at least one plasma producing electrode into said fluid within said reactor, said sustained plasma discharge electrocoagulating said fluid within said reactor by electrochemically reacting with said fluid within said reactor upon electrical stimulation; and
   initiating flocculent formation in said fluid resulting from said sustained plasma discharge in said fluid within said reactor.

2. The method as recited in claim 1, wherein contacting fluid with at least a portion of at least one plasma producing electrode includes contacting fluid with a terminal end of at least one plasma producing electrode.

3. The method as recited in claim 1, wherein contacting fluid with at least a portion of at least one plasma producing electrode includes at least partially submerging the portion of at least one plasma producing electrode in said fluid.

4. The method as recited in claim 1, wherein applying alternating current (AC) electrical energy includes applying at least one of single phase AC power, and three-phase AC power.

5. The method as recited in claim 1, wherein applying alternating current (AC) electrical energy includes applying a constant level of at least one of power, voltage and current to said at least one plasma producing electrode.

6. The method as recited in claim 5, wherein said constant level of power is in the range of 150 VA-1 MVA.

7. The method as recited in claim 6, wherein said constant level of power is in the range of 1-10 kVA.

8. The method as recited in claim 5, wherein said constant level of voltage is in the range of 10-800 volts.

9. The method as recited in claim 5, wherein said constant level of current is in the range of 5-100 amps.

10. The method as recited in claim 1, further comprising varying at least one of power, voltage and current applied to said at least one plasma producing electrode.

11. The method as recited in claim 1, wherein generating plasma discharge includes generating at least one of plasma corona and plasma arc.

12. The method as recited in claim 1, further comprising varying retention time of said fluid in contact with said at least one plasma producing electrode.

13. The method as recited in claim 12, wherein said varying the retention time includes at least one of varying a rate of flow of fluid influent, recirculating at least a portion of said fluid, and varying a rate of flow of recirculating fluid.

14. The method as recited in claim 1, further comprising automating at least one of varying at least one of power, voltage and current applied to said at least one plasma producing electrode; varying retention time of said fluid in contact with said at least one plasma producing electrode; varying a rate of flow of fluid influent; recirculating at least a portion of said fluid; and varying a rate of flow of recirculating fluid.

15. The method as recited in claim 1, wherein said method further comprises transferring said fluid as effluent away from said at least one plasma producing electrode.

16. Fluid treated by the method as recited in claim 1.

17. Fluid treated by the method as recited in claim 1, wherein floc forms and sediments in said fluid to produce visibly clear fluid within 2-4 minutes following treatment with said method.

* * * * *